(12) United States Patent
Imai et al.

(10) Patent No.: US 7,383,118 B2
(45) Date of Patent: Jun. 3, 2008

(54) CONTROL APPARATUS FOR INTERNAL COMBUSTION ENGINE

(75) Inventors: Daichi Imai, Susono (JP); Shigeki Nakayama, Susono (JP); Takao Fukuma, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 48 days.

(21) Appl. No.: 11/628,494

(22) PCT Filed: Sep. 13, 2005

(86) PCT No.: PCT/JP2005/017219

§ 371 (c)(1),
(2), (4) Date: Dec. 5, 2006

(87) PCT Pub. No.: WO2006/030933

PCT Pub. Date: Mar. 23, 2006

(65) Prior Publication Data

US 2007/0255484 A1 Nov. 1, 2007

(30) Foreign Application Priority Data

Sep. 15, 2004 (JP) ............................. 2004-267794

(51) Int. Cl.
*F02M 25/07* (2006.01)
*F02M 51/00* (2006.01)
*F02B 47/08* (2006.01)
*G06F 19/00* (2006.01)

(52) U.S. Cl. ................. 701/104; 123/478; 123/568.21; 701/108

(58) Field of Classification Search ................ 123/478, 123/480, 568.11, 568.21; 701/101–105, 701/108, 115; 60/278, 279, 285, 299, 311, 60/605.2
See application file for complete search history.

(56) References Cited

U.S. PATENT DOCUMENTS 5,377,651 A * 1/1995 Sczomak et al. ...... 123/568.28
5,682,864 A * 11/1997 Shirakawa ............. 123/568.21

(Continued)

FOREIGN PATENT DOCUMENTS

JP      2002004951 A * 1/2002 ................. 701/108

(Continued)

*Primary Examiner*—Willis R Wolfe, Jr.
(74) *Attorney, Agent, or Firm*—Oliff & Berridge, PLC

(57) ABSTRACT

This control apparatus obtains a relation (trade-off line) between NOx generation amount and PM generation amount with EGR ratio serving as a parameter from an NOx generation amount estimation model which calculates the NOx generation amount on the basis of the oxygen mole concentration of intake gas and a PM generation amount estimation model which calculates the PM generation amount on the basis of an excess air factor. Further, the control apparatus obtains a straight line (ratio determination line) which passes through a point (appropriate point A) corresponding to a combination of steady-condition appropriate values of the NOx generation amount and the PM generation amount under the present operating conditions and which has a slope K determined in consideration of a regulation value based on a law relating to emission control. The control apparatus uses an intersection (target point B) between the trade-off line and the ratio determination line as an emission target value, and sets an EGR ratio target value Regrt to an EGR ratio corresponding to the target point B.

8 Claims, 11 Drawing Sheets

U.S. PATENT DOCUMENTS

| | | | |
|---|---|---|---|
| 6,725,829 B2* | 4/2004 | Kataoka et al. | 123/568.21 |
| 6,816,771 B2* | 11/2004 | Miura et al. | 701/108 |
| 7,313,913 B2* | 1/2008 | Okugawa et al. | 60/311 |
| 7,328,577 B2* | 2/2008 | Stewart et al. | 701/108 |
| 2005/0022511 A1* | 2/2005 | Miura | 123/568.21 |

FOREIGN PATENT DOCUMENTS

| | | |
|---|---|---|
| JP | A 2002-195071 | 7/2002 |
| JP | A 2002-371893 | 12/2002 |
| JP | A 2004-150296 | 5/2004 |

* cited by examiner

CONTROL APPARATUS FOR INTERNAL COMBUSTION ENGINE

TECHNICAL FIELD

The present invention relates to a control apparatus for an internal combustion engine for controlling the generation amounts of nitrogen oxides (called "NOx" in the present specification) and fine particulate substances (particulate matter or smoke, collectively called "PM" in the present specification) within exhaust gas discharged from an exhaust passage of an internal combustion engine. In particular, the present invention relates to an apparatus for controlling the ratio of a flow rate of EGR gas taken into a cylinder of the engine to a flow rate of gas taken into the cylinder (hereinafter referred to as "EGR ratio") to thereby control the generation amount of NOx and the generation amount of PM.

BACKGROUND ART

In internal combustion engines, such as spark-ignition engines and diesel engines, (in particular, diesel engines), it is required to effectively reduce the generation amount of harmful substances, such as NOx and PM (hereinafter may be collectively referred to as "emission"), generated upon operation of the engines.

In order to reduce the emission generation amount, controlling the emission generation amount to a predetermined target value is effective. In a diesel engine, the generation amount of NOx has a strong correlation with the EGR ratio. Therefore, a control apparatus for an internal combustion engine (diesel engine) described in Japanese Patent Application Laid-Open (kokai) No. 2002-371893 estimates the amount of NOx generated from combustion, by use of an expanded Zeldovich mechanism, which is a typical known combustion model, from combustion temperature and gas-mixture concentration calculated on the basis of combustion pressure and intake-gas oxygen concentration, which are detected by means of a cylinder interior pressure sensor and an intake-gas oxygen concentration sensor, respectively. Then, the control apparatus controls the EGR ratio, etc. such that the estimated NOx generation amount coincides with a predetermined target value.

Incidentally, it is known that when the EGR ratio is increased to reduce the NOx generation amount, the PM generation amount increases (in particular, in diesel engines). That is, the ratio between the NOx generation amount and the PM generation amount is determined by the EGR ratio, and when the EGR ratio is controlled only for reduction of the NOx generation amount, the PM generation amount increases. This is unfavorable from the viewpoint of effectively reducing the emission generation amount as a whole.

In other words, in order to effectively reduce the emission generation amount as a whole, a target value of the emission generation amount (accordingly, a target value of the EGR ratio) must be determined in consideration of the balance between the NOx generation amount and the PM generation amount.

In view of the above, in general, a combination of a steady-condition appropriate value of the NOx generation amount (steady-condition appropriate NOx generation amount) and a steady-condition appropriate value of the PM generation amount (steady-condition appropriate PM generation amount) under the present operating conditions of the engine (for example, fuel injection quantity, engine rotational speed, etc.) is used as a target value of the emission generation amount. The EGR ratio is controlled such hat the actual EGR ratio coincides with an EGR ratio target value corresponding to the emission generation amount target value.

Here, the steady-condition appropriate NOx generation amount and the steady-condition appropriate PM generation amount are an NOx generation amount and a PM generation amount which are previously determined such that their combination becomes optimal from the viewpoint of the balance between the NOx generation amount and the PM generation amount in the case where the engine is operated steady under present operating conditions (for example, fuel injection quantity, engine rotational speed, etc.).

Such steady-condition appropriate NOx generation amount and steady-condition appropriate PM generation amount can be obtained as follows. An experiment is performed so as to determine the steady-condition appropriate NOx generation amount and the steady-condition appropriate PM generation amount in a state where the engine is maintained at a certain steady operating condition. The experiment is repeated while the operation conditions (for example, fuel injection quantity, engine rotational speed, etc.) of the engine are changed in various ways.

However, in general, even when the engine is under the same operating conditions (for example, fuel injection quantity, engine rotational speed, etc.), the relation between the NOx generation amount and the PM generation amount changes depending on whether the engine is in steady operating condition or transient operating condition; e.g., a condition in which the rotational speed of the engine increases abruptly. In other words, even when the engine is under the same operating conditions (for example, fuel injection quantity, engine rotational speed, etc.), the ratio between the NOx generation amount and the PM generation amount for the same EGR ratio changes depending on whether the engine is in transient operating condition or steady operating condition.

Accordingly, in the case where the EGR ratio is controlled, while the steady-condition appropriate NOx generation amount and the steady-condition appropriate PM generation amount are used as a target value of the emission generation amount, when the engine is in transient operating condition, the balance between the NOx generation amount and the PM generation amount is lost, and as a result, there arises a problem in that the emission generation amount cannot be effectively reduced as a whole.

DISCLOSURE OF THE INVENTION

The present invention has been achieved to cope with the above problems, and an object of the invention is to provide a control apparatus for an internal combustion engine which can maintain a good balance between the NOx generation amount and the PM generation amount so as to effectively reduce the emission generation amount as a whole, even when the engine is in transient operating condition.

A control apparatus (or an EGR control apparatus) for an internal combustion engine according to the present invention is applied to an engine which includes an EGR passage for connecting an exhaust passage and an intake passage of the engine and an EGR control valve disposed in the EGR passage and adapted to control a flow rate of EGR gas flowing from the exhaust passage to the intake passage. The control apparatus includes operating-condition obtainment means, EGR-ratio-obtainment-value obtainment means, relation obtainment means, generation ratio determination means, EGR-ratio-target-value determination means, and EGR-control-valve control means. These means will be described successively.

The operating-condition obtainment means obtains operating conditions of the engine. By making use of outputs of sensors, etc., the operating-condition obtainment means obtains the rotational speed of the engine, the flow rate of air passing through the intake passage, the operation amount of an accelerator pedal, etc., which are operating conditions of the engine (parameters representing the operating conditions) required for calculations in the EGR-ratio-obtainment-value obtainment means and the relation obtainment means.

The EGR-ratio-obtainment-value obtainment means obtains, as an EGR ratio obtainment value, an EGR ratio determined on the basis of the obtained operating conditions. The EGR ratio obtainment value can be obtained by, for example, estimating a quantity of gas taken in a cylinder of the engine during an intake stroke (cylinder interior intake gas quantity) and a quantity of air (new air) flowing through the intake passage in the intake stroke, on the basis of the obtained operating conditions.

The relation obtainment means obtains, on the basis of the obtained operating conditions, a relation between NOx generation amount (its instantaneous value) and PM generation amount (its instantaneous value) in the obtained operating conditions. By virtue of this configuration, it becomes possible to repeatedly obtain an accurate relation (a mathematical formula or the like representing the relation) between the instantaneous value of the NOx generation amount and the instantaneous value of the PM generation amount, on the basis of the operating conditions obtained repeatedly, even when the engine is in transient condition.

The generation ratio determination means determines the ratio between the NOx generation amount and the PM generation amount. By virtue of this means, as will be described later, a target ratio (a mathematical formula or the like representing the ratio) between the NOx generation amount and the PM generation amount for effectively reducing the overall emission generation amount is determined in consideration of, for example, a regulation value for the NOx generation amount and that for the PM generation amount.

The EGR-ratio-target-value determination means determines a target value of the EGR ratio from the obtained relation between the NOx generation amount and the PM generation amount and the determined ratio between the NOx generation amount and the PM generation amount. For example, a target value (its instantaneous value) of the emission generation amount which can maintain a target ratio between the NOx generation amount and the PM generation amount can be obtained by preparing, in the form of simultaneous equations, a mathematical formula representing the relation between the instantaneous value of the NOx generation amount and the instantaneous value of the PM generation amount and a mathematical formula representing the target ratio between the NOx generation amount and the PM generation amount.

Once the emission generation amount target value (its instantaneous value) can be obtained, an EGR ratio target value (its instantaneous value) for achieving the emission generation amount target value can be obtained. That is, according to the EGR-ratio-target-value determination means, the EGR ratio target value (its instantaneous value) can be repeatedly determined such that the target ratio between the NOx generation amount and the PM generation amount can be maintained even when the engine is in transient condition.

The EGR-control-valve control means controls the opening of the EGR control valve such that the EGR ratio obtainment value coincides with the EGR ratio target value. By virtue of this means, the opening of the EGR control valve is repeatedly controlled such that the EGR ratio obtainment value coincides with the EGR ratio target value repeatedly determined as described above.

Accordingly, even when the engine is in transient condition, the NOx generation amount and the PM generation amount are repeatedly controlled such that the actual ratio between the NOx generation amount and the PM generation amount is maintained at the target ratio. As a result, even when the engine is in transient condition, it is possible to maintain a good balance between the NOx generation amount and the PM generation amount which effectively reduce the emission generation amount as a whole.

In the control apparatus according to the present invention, preferably, the relation obtainment means is configured to obtain the relation between the NOx generation amount and the PM generation amount by making use of an NOx generation amount estimation model which calculates the NOx generation amount on the basis of an intake-gas oxygen concentration, which is an oxygen concentration of gas taken into a cylinder of the engine, and a PM generation amount estimation model which calculates the PM generation amount on the basis of an excess air factor of the gas taken into the cylinder of the engine.

It is known that the NOx generation amount has a strong correlation with the intake-gas oxygen concentration. Further, it is known that the PM generation amount has a strong correlation with the excess air factor. Accordingly, a mathematic formula which accurately represents the relation between the instantaneous value of the NOx generation amount and the instantaneous value of the PM generation amount can be obtained by preparing, in the form of simultaneous equations, a mathematical formula representing the NOx generation amount estimation model that defines the relation between the intake-gas oxygen concentration and the NOx generation amount and a mathematical formula representing the PM generation amount estimation model that defines the relation between the excess air factor and the PM generation amount.

Preferably, the control apparatus according to the present invention further comprises required-fuel-injection-quantity determination means for determining a required fuel injection quantity, which is a quantity of fuel to be injected, on the basis of the obtained operating conditions; and cylinder-interior-intake-gas-quantity determination means for determining a cylinder interior intake gas quantity, which is a quantity of gas taken into the cylinder of the engine, on the basis of the obtained operating conditions, wherein the relation obtainment means obtains the relation between the NOx generation amount and the PM generation amount by making use of the determined required fuel injection quantity and the calculated cylinder interior intake gas quantity.

As will be described later, the relation between the instantaneous value of the NOx generation amount and the instantaneous value of the PM generation amount greatly depends on the required fuel injection quantity and the cylinder interior intake gas quantity, which change with time in transient operating condition. By virtue of the above-described configuration, the required fuel injection quantity and the cylinder interior intake gas quantity can be incorporated, as variables, into the mathematical formula that represents the relation between the instantaneous value of the NOx generation amount and the instantaneous value of the PM generation amount. As a result, this mathematical formula can represents more accurately the relation between the instantaneous value of the NOx generation amount and the instantaneous value of the PM generation amount even when the engine in transient operating condition.

In the control apparatus, preferably, the generation ratio determination means is configured to determine the ratio between the NOx generation amount and the PM generation amount by making use of the relation between two combinations; i.e., a combination of the NOx generation amount and the PM generation amount (hereinafter may be referred to as "individually measured values") previously measured for the case where the engine is operated steady in the obtained operating conditions, and a predetermined combination regarding a regulation value of the NOx generation amount and a regulation value of the PM generation amount (hereinafter may be simply referred to as "regulation values").

Here, the "individually measured values" refer to the total amount of NOx and the total amount of PM which are generated when the engine is operated steady in the present operating conditions (for example, fuel injection quantity, engine rotational speed, etc.) for a predetermined period of time (or when a vehicle equipped with the engine travels over a predetermined distance). The individually measured values are measured in advance by means of a predetermined experiment or the like.

Further, the "regulation values" refer to respective upper limits which are imposed by a law on the total amount of NOx and the total amount of PM which are generated when a vehicle equipped with the engine travels in accordance with a pattern (e.g., 10·15 mode) prescribed by the law.

From the relation between the combination of the individually measured values and the predetermined combination regarding the regulation values (the relation between the two combinations), an "allowance at the present point in time" of an individually measured value (its instantaneous value) with respect to the corresponding regulation value can be obtained for each of NOx and PM. Accordingly, by virtue of the above-described configuration, the target ratio between the NOx generation amount and the PM generation amount is repeatedly determined in such a manner that the generation mount of NOx or PM, whichever has a smaller "allowance at the present point in time," is more suppressed. Thus, the target ratio between the NOx generation amount and the PM generation amount can be repeatedly determined such that neither the NOx generation amount nor the PM generation amount exceeds the corresponding regulation value if possible.

In the control apparatus according to the present invention, the generation ratio determination means may be configured to determine the ratio between the NOx generation amount and the PM generation amount by making use of the relation between two combinations; i.e., a combination of the total NOx generation amount and the total PM generation amount (hereinafter may be referred to as "total measured values") previously measured for the case where the engine is operated in accordance with the predetermined pattern, and a predetermined combination regarding the above-described regulation values.

Here, the "total measured values" refer to the total amount of NOx and the total amount of PM which are generated when a vehicle equipped with the engine travels in accordance with a pattern (e.g., 10·15 mode) prescribed by the law. The total measured values are measured in advance by means of a predetermined experiment or the like.

From the relation between the combination of the total measured values and the predetermined combination regarding the regulation values (the relation between the two combinations), an "overall allowances," with respect to the regulation values, of the total NOx generation amount and the total PM generation amount when the engine is operated in accordance with the predetermined pattern can be obtained. Accordingly, by virtue of the above-described configuration, the target ratio between the NOx generation amount and the PM generation amount is repeatedly determined in such a manner that the generation mount of NOx or PM, whichever has a smaller "overall allowance," is more suppressed. Thus, in this case as well, the target ratio between the NOx generation amount and the PM generation amount can be repeatedly determined such that neither the NOx generation amount nor the PM generation amount exceeds the corresponding regulation value if possible.

Preferably, the control apparatus according to the present invention further comprises steady-condition-appropriate-value obtainment means for obtaining a steady-condition appropriate NOx generation amount and a steady-condition appropriate PM generation amount on the basis of the obtained operating conditions, wherein the generation ratio determination means determines the ratio between the NOx generation amount and the PM generation amount by making use of a formula representing a straight line which passes through a point corresponding to a combination of the obtained steady-condition appropriate NOx generation amount and steady-condition appropriate PM generation amount and which has a slope representing a ratio of an increase in the PM generation amount to an increase in the NOx generation amount, the ratio being obtained from the relation of the two combinations; and the EGR-ratio-target-value determination means determines the EGR ratio target value from the formula representing the relation between the NOx generation amount and the PM generation amount obtained by means of the relation obtainment means and the formula representing the straight line used by means of the generation ratio determination means.

By virtue of this configuration, the emission generation amount target value (its instantaneous value) and accordingly the EGR ratio target value (its instantaneous value) can be obtained preparing, in the form of simultaneous equations, a formula representing the straight line, which formula represents the target ratio between the NOx generation amount and the PM generation amount and a formula representing the ratio between the NOx generation amount and the PM generation amount. The EGR ratio target value is a value determined in consideration of the above-described "allowance at the present point in time" or the above-described "overall allowance", as will be described later, and can be a value for controlling the NOx generation amount and the PM generation amount such that neither the NOx generation amount nor the PM generation amount exceeds the regulation value if possible.

In any of the above-described control apparatuses according to the present invention, preferably, the EGR-ratio-target value determination means sets the EGR ratio target value to zero when the determined EGR ratio target value is negative.

In actuality, the EGR ratio assumes a value in the range of "0" to "1" inclusive. However, when the engine is in a transient condition in which operating conditions change excessively, the EGR ratio target value (its instantaneous value) obtained from the above-described simultaneous equations; i.e., the formula representing the relation between the NOx generation amount and the PM generation amount and the formula representing the target ratio between the NOx generation amount and the PM generation amount (e.g., the formula representing the above-described straight line) assumes a negative value in some cases.

In such a case, the EGR ratio target value must be reset to a value in the range of "0" to "1" inclusive. Here, the greater the degree to which the reset EGR ratio target value deviates from the obtained negative EGR ratio target value, the greater the degree to which the ratio between the NOx generation amount and the PM generation amount deviates from the target ratio. Accordingly, in this case, resetting the EGR ratio target value to "0," which is a value closest to the obtained negative EGR ratio target value among realizable EGR ratios as in the above-described configuration is considered to be preferred.

In the case where the control apparatus according to the present invention is configured to reset the EGR ratio target value to zero when the EGR ratio target value becomes negative, preferably, the control apparatus further comprises required-fuel-injection-quantity determination means for determining a required fuel injection quantity, which is a quantity of fuel to be injected, on the basis of the obtained operating conditions; fuel injection instruction means for instructing injection of fuel in the determined required fuel injection quantity; and fuel-injection-quantity-limit-value obtainment means, operable when the EGR ratio target value determined by the EGR-ratio-target-value determination means becomes negative, for obtaining, as a fuel injection quantity limit value, a flue injection quantity required to obtain a relation between the NOx generation amount and the PM generation amount for bringing the EGR ratio target value to zero, while maintaining the ratio between the NOx generation amount and the PM generation amount determined by means of the generation ratio determination means, wherein the fuel injection instruction means instructs injection of fuel in a quantity corresponding to the obtained fuel injection quantity limit value, instead of instructing injection of fuel in the determined required fuel injection quantity, when the EGR ratio target value determined by the EGR-ratio-target-value determination means becomes negative.

By virtue of this configuration, when the EGR ratio target value is reset to "0," the fuel injection quantity is changed (limited) from the required fuel injection quantity to a quantity corresponding to the fuel injection quantity limit value, whereby it becomes possible to maintain the ratio between the NOx generation amount and the PM generation amount at the target ratio, while controlling the EGR ratio to "0." As a result, when the engine is in transition condition, it is possible to maintain a good balance between the NOx generation amount and the PM generation amount which more effectively reduces the emission generation amount as a whole.

BEST MODE FOR CARRYING OUT THE INVENTION

A control apparatus for an internal combustion engine (diesel engine) according to an embodiment of the present invention will now be described with reference to the drawings.

Figure 1:
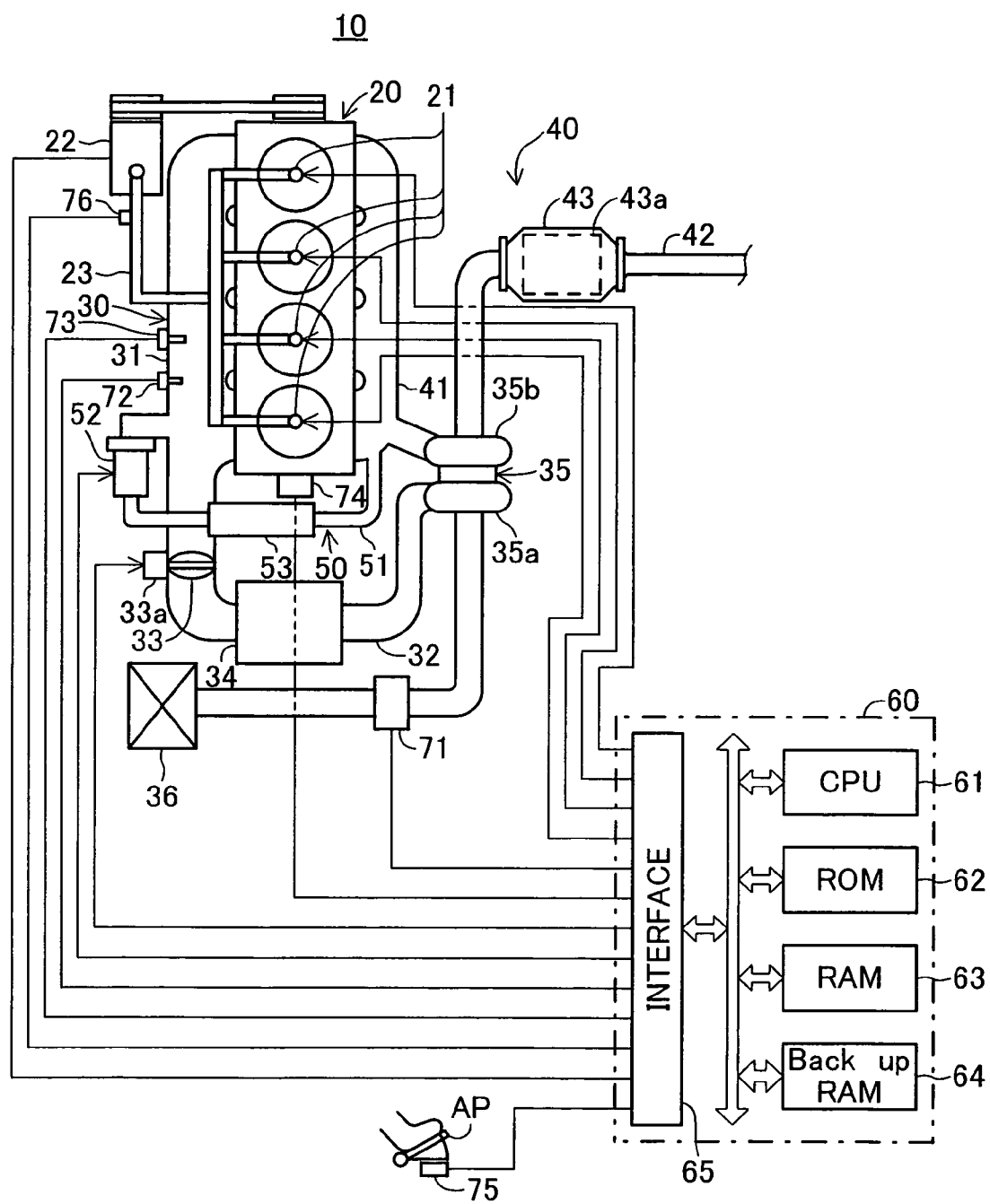
FIG. 1 is a schematic diagram showing the overall configuration of a system in which a control apparatus for an internal combustion engine according to an embodiment of the present invention is applied to a four-cylinder internal combustion engine (diesel engine).

FIG. 1 schematically shows the entire configuration of a system in which a control apparatus for an internal combustion engine according to the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to an instruction fuel injection pressure Pcrfin to be described later), the fuel injection pump 22 pressurizes fuel in such a manner that the actual injection pressure (discharge pressure) Pcr of fuel becomes equal to the instruction fuel injection pressure Pcrfin.

Thus, fuel pressurized to the instruction fuel injection pressure Pcrfin is supplied from the fuel injection pump 22 to the fuel injection valves 21. Moreover, the fuel injection valves 21 are electrically connected to the electronic control apparatus 60. In accordance with a drive signal (an instruction signal corresponding to an instruction fuel injection quantity qfin) from the electronic control apparatus 60, each of the fuel injection valves 21 opens over a predetermined period so that the fuel pressurized to the instruction fuel injection pressure Pcrfin is injected directly to the combustion chamber of the corresponding cylinder in the instruction fuel injection quantity qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electronic control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The DPNR 43 includes a filter 43a formed of a porous material such as cordierite and which collects, by means of a porous surface, the particulate matter contained in exhaust gas passing through the filter. In the DPNR 43, at least one metal element selected from alkaline metals such as potassium K, sodium Na, lithium Li, and cesium Cs; alkaline-earth metals such as barium Ba and calcium Ca; and rear-earth metals such as lanthanum La and yttrium Y is carried, together with platinum, on alumina serving as a carrier. Thus, the DPNR 43 also serves as a storage-reduction-type NOx catalyst unit which, after absorption of NOx, releases the absorbed NOx and reduces it.

The EGR apparatus 50 includes an exhaust circulation pipe 51, which forms a passage (FGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data. The backup RAM 64 stores data in a state in which the power supply is on, and holds the stored data even after the power supply is shut off. The interface 65 contains A/D converters.

The interface 65 serves as the air-flow-rate (new air flow rate) measurement means. The interface 65 is connected to a hot-wire-type air flow meter 71 disposed in the intake pipe 32; an intake gas temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of a point where the exhaust circulation pipe 51 is connected to the intake passage; a crank position sensor 74; an accelerator opening sensor 75; a fuel pressure sensor 76 provided in the fuel pipe 23 in the vicinity of the discharge port of the fuel injection pump 22. The interface 65 receives respective signals from these sensors, and supplies the received signals to the CPU 61. These sensors correspond to the operating-condition obtainment means.

Further, the interface 65 is connected to the fuel injection valves 21, the fuel injection pump 22, the throttle valve actuator 33a, and the EGR control valve 52; and outputs corresponding drive signals to these components in accordance with instructions from the CPU 61.

The hot-wire-type air flow meter 71 measures the mass flow rate of intake air passing through the intake passage (intake air quantity per unit time, new air quantity per unit time), and generates a signal indicating the mass flow rate Ga (air flow rate Ga). The intake-gas temperature sensor 72 measures the temperature of gas that is taken into each cylinder (i.e., each combustion chamber or cylinder interior) of the engine 10 (i.e., intake-gas temperature), and generates a signal representing the intake-gas temperature Tb. The intake pipe pressure sensor 73 measures the pressure of gas that is taken into each cylinder of the engine 10 (i.e., intake pipe pressure), and generates a signal representing the intake pipe pressure Pb.

The crank position sensor 74 detects the absolute crank angle of each cylinder, and generates a signal representing the crank angle CA and engine rotational speed NE; i.e., rotational speed of the engine 10. The accelerator opening sensor 75 detects an amount by which an accelerator pedal AP is operated, and generates a signal representing the accelerator pedal operated amount Accp. The fuel pressure sensor 76 detects the pressure of fuel flowing through the fuel line 23, and generates a signal representing an injection pressure Pcr.

(Outline of Operation of Intake and Exhaust Systems)

Figure 2:
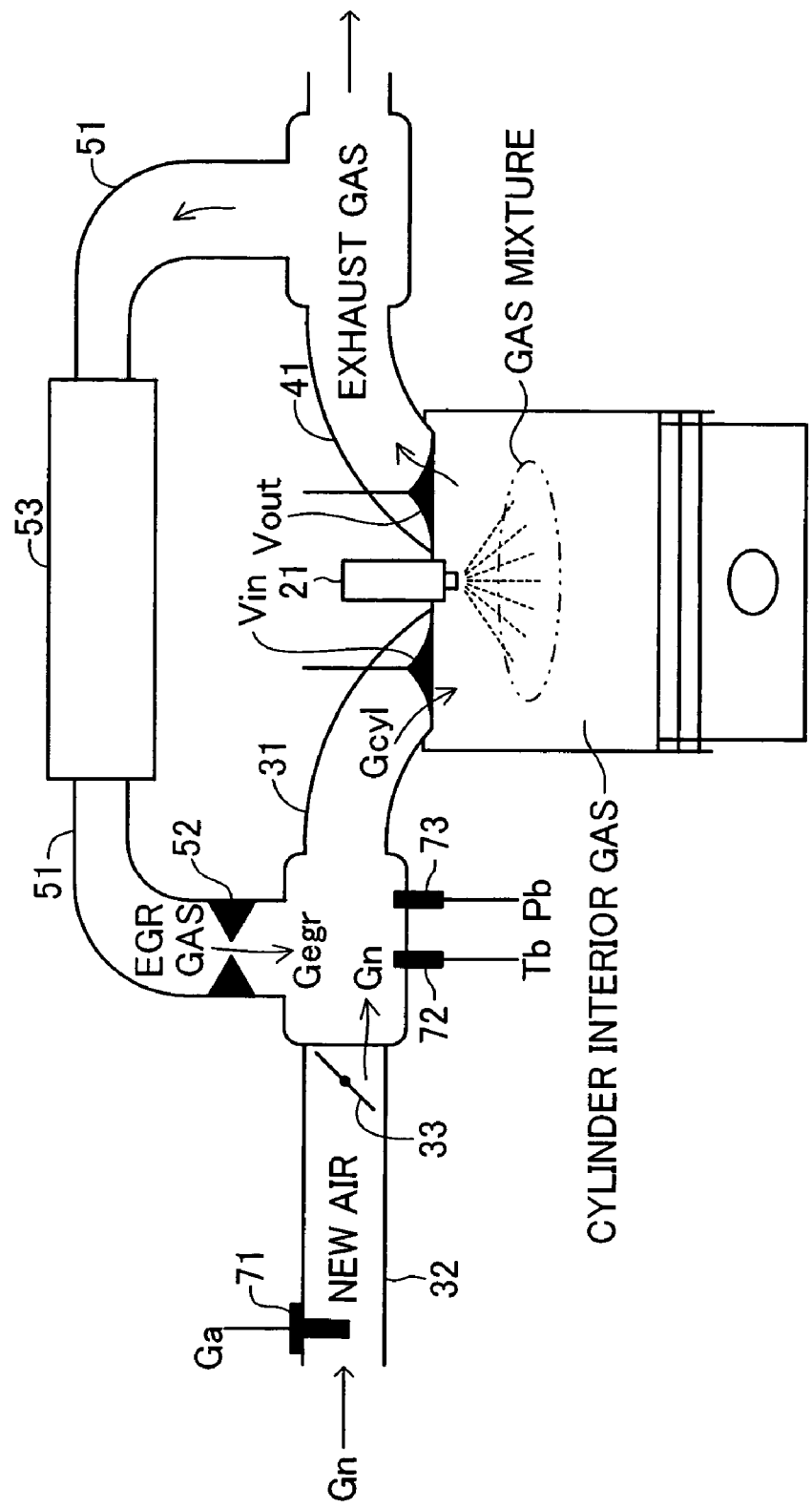
FIG. 2 is a schematic cross-sectional view around a cylinder for describing the outline of operation of intake and exhaust systems of the combustion engine shown in FIG. 1.
Figure 3:
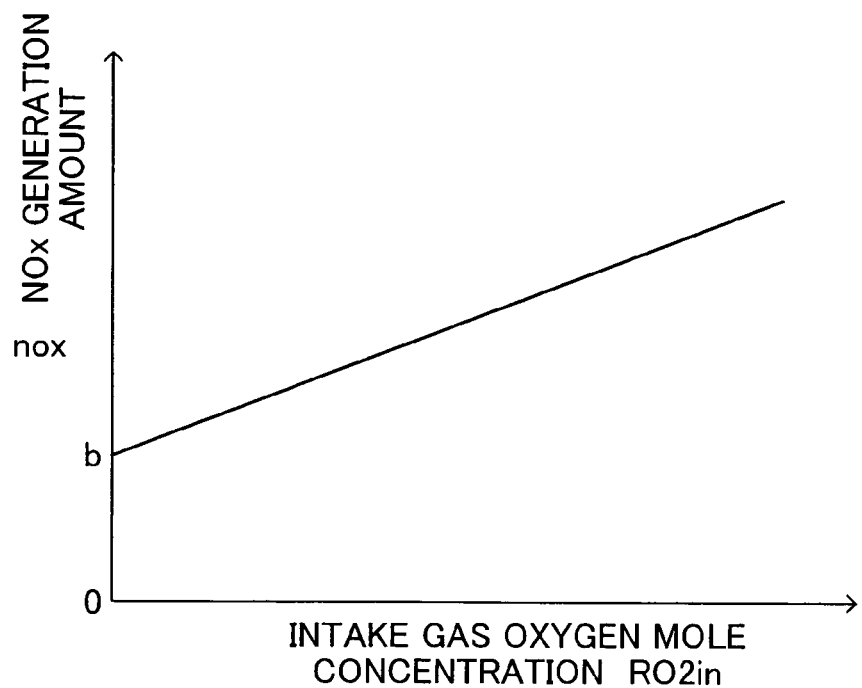
FIG. 3 is a graph showing the relation between intake gas oxygen mole concentration and NOx generation amount estimated by an NOx generation amount estimation model which the control apparatus shown in FIG. 1 uses.
Figure 4:
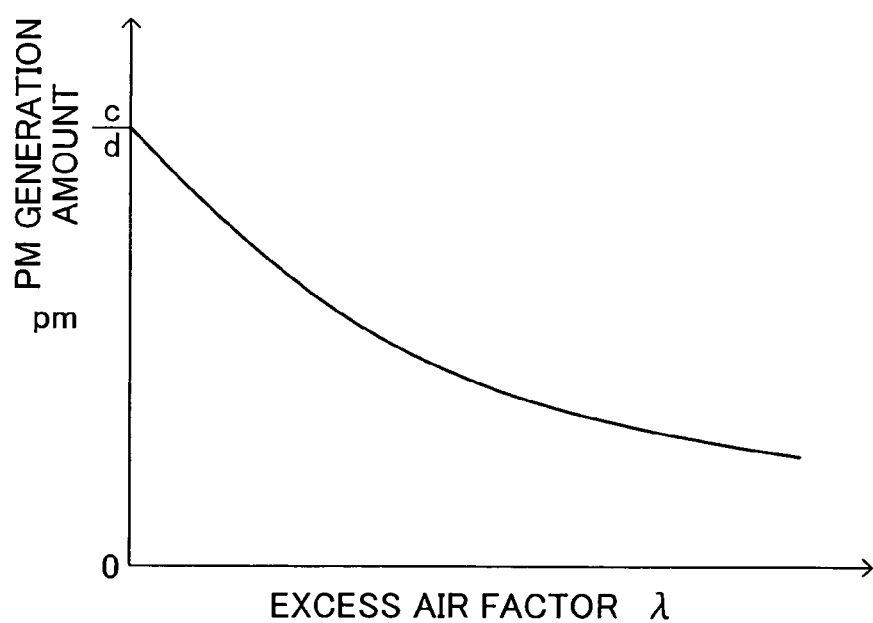
FIG. 4 is a graph showing the relation between an excess air factor and the PM generation amount estimated by a PM generation amount estimation model which the control apparatus shown in FIG. 1 uses.

Next, there will be described the outline of the operation of the intake and exhaust systems of the control apparatus for the internal combustion engine having the above-described configuration (hereinafter referred to as the "present apparatus"). FIG. 2 is a diagram schematically showing a state in which gas is taken from the intake manifold 31 into a certain cylinder (cylinder interior) and is then discharged to the exhaust manifold 41.

As shown in FIG. 2, the gas taken into the cylinder (cylinder interior gas) includes new air taken from the tip end of the intake pipe 32 via the throttle valve 33, and EGR gas taken from the exhaust circulation pipe 51 via the EGR control valve 52. The ratio (i.e., EGR ratio Regr=Gegr/Gcyl) of the EGR gas quantity Gegr to the cylinder interior intake gas quantity Gcyl which is the sum of the quantity (mass) Gn of the taken new air and the quantity (mass) Gegr of the taken EGR gas changes depending on the opening of the throttle valve 33 and the opening of the EGR control valve 52, which are controlled by the electronic control apparatus 60 (CPU 61) in accordance with the operating condition as will be described later.

During an intake stroke, such new air and EGR gas are taken into the cylinder via an opened intake valve Vin as the piston moves downward, and the thus-produced gas mixture serves as cylinder interior gas. The cylinder interior gas is confined within the cylinder when the intake valve Vin closes upon the piston having reached the bottom dead center (hereinafter referred to as "ATDC-180°"), and is then compressed in a subsequent compression stroke as the piston moves upward.

When the piston reaches a vicinity of the top dead center (specifically, when an instruction fuel injection timing finjfin to be described later comes), the present apparatus opens the corresponding fuel injection valve 21 over a predetermined time corresponding to the above-described instruction fuel injection quantity qfin, to thereby inject fuel directly into the cylinder interior. As a result, with elapse of time, the injected fuel disperses conically within the cylinder interior, while mixing with the cylinder interior gas to produce a gas mixture. A self-ignition occurring at a predetermined timing causes the combustion (diffuse combustion) of the gas mixture.

The gas remaining in the combustion chamber after combustion is discharged, as exhaust gas, from the opened exhaust valve Vout to the exhaust manifold 41 via the exhaust passage as the piston moves upward during an exhaust stroke. Such exhaust gas is discharged to the exterior via the exhaust pipe 42.

(Outline of EGR Control by Present Apparatus)

Next, the outline of EGR control by the present apparatus (specifically, control of the EGR ratio Regr) will be described. As described above, NOx generation amount and PM generation amount (that is, emission generation amount) in the diesel engine greatly depends on the EGR ratio Regr, and the ratio between the NOx generation amount and the PM generation amount can be determined by the EGR ratio Regr.

That is, a large EGR ratio Regr decreases the NOx generation amount and increases the PM generation amount. Meanwhile, a small EGR ratio Regr increases the NOx generation amount and decreases the PM generation amount. Thus, between the NOx generation amount and the PM generation amount, there is a trade-off relation in which one decreases when the other increases.

Both NOx and PM are harmful matter. Accordingly, in order to effectively decrease the overall emission generation amount, it is preferred that a target ratio between the NOx generation amount and the PM generation amount is set, and then the EGR ratio Reger is controlled such that the actual ratio between the NOx generation amount and the PM generation amount coincides with the target ratio.

Here, in order to render the actual ratio between the NOx generation amount and the PM generation amount coincident with the above-described target ratio, the relation between the NOx generation amount and the PM generation amount must be obtained accurately. First, there will be described below a method for obtaining an equation which accurately represents the relation between the NOx generation amount and the PM generation amount.

<Relation Between the NOx Generation Amount and the PM Generation Amount>

The NOx generation amount has a strong correlation with the oxygen concentration of the cylinder interior gas. According to various experiments, the relation between NOx generation amount nox and intake gas oxygen mole concentration RO2in can be represented by the following Eq. 1. In Eq. 1, the NOx generation amount nox represents an NOx generation amount per unit fuel injection quantity and one combustion cycle. The intake gas oxygen mole concentration RO2in represents the ratio of the amount by mole of oxygen present in cylinder interior gas to the total amount by mole of the cylinder interior gas. Values a and b are constants. Eq. 1 corresponds to "an NOx generation amount estimation model for calculating the NOx generation amount on the basis of the oxygen concentration of intake gas."

$$nox = a \cdot RO2in + b \quad (1)$$

The PM generation amount has a strong correlation with an excess air factor of the cylinder interior gas. According to various experiments, the relation between PM generation amount pm and excess air factor $\lambda$ of the cylinder interior gas can be represented by the following Eq. 2. In Eq. 2, pm represents a PM generation amount per unit fuel injection quantity and one combustion cycle. The excess air factor $\lambda$ is a value which can be represented by the following Eq. 3. Values c and d are constants. Eq. 2 corresponds to "a PM generation amount estimation model for calculating the PM generation amount on the basis of the excess air factor."

$$pm = \frac{c}{\lambda + d} \quad (2)$$

$$\lambda = \frac{Gn}{Q \cdot AFth} = \frac{Gcyl \cdot (1 - Regr)}{Q \cdot AFth} = Z \cdot (1 - Regr) \quad (3)$$

In Eq. 3, Gn represents the quantity of new air taken into a cylinder during a single intake stroke. Q represents the fuel injection quantity (required fuel injection quantity). Gcyl represents the quantity of gas taken into the cylinder during a single intake stroke (total cylinder interior gas quantity). A value Z represents "Gcyl/(Q·Afth)." AFth represents the stoichiometric air-fuel ratio. Reger represents the EGR ratio which is represented by the following Eq. 4. In Eq. 4, Gegr represents the quantity of EGR gas taken into the cylinder during a single intake stroke.

$$Regr = \frac{Gegr}{Gcyl} = \frac{Gcyl - Gn}{Gcyl} \quad (4)$$

Further, it is known that the intake gas oxygen mole concentration RO2in can be approximated by the following Eq. 5, which uses an air oxygen mole concentration RO2air (constant) that is the mole concentration of oxygen present in air.

$$RO2in = RO2air \cdot \left(1 - \frac{Regr}{\lambda}\right) \quad (5)$$

Here, from the above Eq. 1, Eq. 3, and Eq. 5, the intake gas oxygen mole concentration RO2in and the excess air factor λ can be eliminated to obtain the following Eq. 6. This Eq. 6 represents the relation between the EGR ratio Regr and the NOx generation amount nox. As can be understood from Eq. 6, the NOx generation amount decreases when the EGR ratio Reger increases. Here, the right side of Eq. 6 is a function for obtaining the EGR ratio Reger, while using variables nox and z as arguments. In the following description, the right side of Eq. 6 may be represented as "funcReger(nox, Z)."

$$Regr = \frac{RO2air \cdot a + b - nox}{\frac{RO2air \cdot a}{Z} + RO2air \cdot a + b - nox} \quad (6)$$

Meanwhile, from the above Eq. 2 and Eq. 3, the excess air factor λ can be eliminated to obtain the following Eq. 7. This Eq. 7 represents the relation between the EGR ratio Regr and the PM generation amount pm. As can be understood from Eq. 7, the PM generation amount increases when the EGR ratio Reger increases.

$$Regr = \frac{Z+d}{Z} - \frac{c}{pm \cdot z} \quad (7)$$

The EGR ratio Regr can be eliminated from the above Eq. 6 and Eq. 7 to obtain the following Eq. 8.

$$pm = \frac{1}{\frac{1}{c} \cdot \left(d + \frac{RO2air \cdot a}{\frac{RO2air \cdot a}{Z} + RO2air \cdot a + b - nox}\right)} \quad (8)$$

The above Eq. 8 represents the relation between the NOx generation amount nox and the PM generation amount pm, while using the EGR ratio Regr as a parameter. Such relation is represented by a curve (hereinafter referred to as the "trade-off line") shown in FIG. 5. Here, a value noxegr0 represents an NOx generation amount nox corresponding to "EGR ratio Regr=0." The value noxegr0 is a constant which can be obtained with the EGR ratio Regr being set to 0 in the above Eq. 6 (noxegr0=RO2air·a+b).

Figure 5:
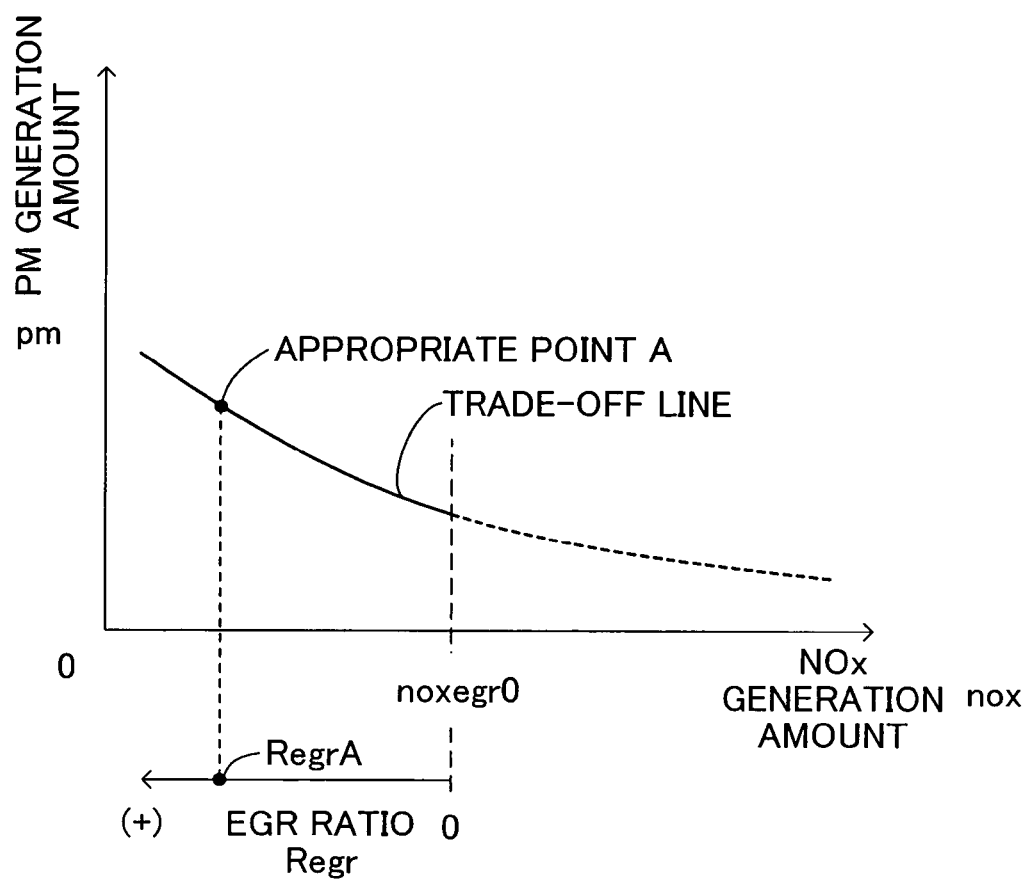
FIG. 5 is a graph showing a relation (trade-off line) between the NOx generation amount and the PM generation amount obtained by the NOx generation amount estimation model and the PM generation amount estimation model, respectively, which the control apparatus shown in FIG. 1 uses.

As can be understood from the above Eq. 8, the trade-off line is determined depending on a value Z (=Gcyl/(Q·AFth)). That is, the smaller the value Z, the more upward the trade-off line moves in the coordinate system as shown in FIG. 5. Here, the cylinder interior intake gas quantity Gcyl and the required fuel injection quantity Q (accordingly, the value Z) is maintained constant in steady operating condition, while it changes with time in transient operating condition.

Therefore, the trade-off line does not change in steady operating condition, while it changes with time in transient operating condition. Thus, the trade-off line provides a curve which accurately represents the relation between an instantaneous value of the NOx generation amount nox and an instantaneous value of the PM generation amount pm not only in steady operating condition but also in transient operating condition. In other words, a point corresponding to a combination of the NOx generation amount nox and PM generation amount pm is always on the trade-off line, not only in steady operating condition but also in transient operating condition.

Thus, the above Eq. 8 can accurately represents the relation between the NOx generation amount and the PM generation amount not only in steady operating condition but also in transient operating condition, by making use of the cylinder interior intake gas quantity Gcyl and the required fuel injection quantity Q. Means for obtaining the relation between the NOx generation amount and the PM generation amount in accordance with Eq. 8 corresponds to the relation obtainment means. Notably, the right side of Eq. 8 is a function for obtaining the PM generation amount pm, while using variables Z and nox as arguments. In the following description, the right side of Eq. 8 may be represented as "funcpm1(Z, nox)."

<Method for Determining the Ratio Between the NOx Generation Amount and the PM Generation Amount>

Next, a method for determining a target ratio between the NOx generation amount and the PM generation amount will be described. As described above, a point corresponding to a combination of the NOx generation amount nox and the PM generation amount pm is always on the trade-off line. Therefore, the ratio between the NOx generation amount and the PM generation amount is determined on the basis of a selected point on trade-off line, which is used as an emission target value (that is, an NOx generation amount target value and a PM generation amount target value).

Here, the present apparatus stores in the ROM 62 tables MapnoxTA(Q, NE) and MappmTA(Q, NE) which define relations between an operating condition (the required fuel injection quantity Q and the engine rotational speed NE in the present example) and the above-described steady-condition appropriate NOx generation amount noxTA and the steady-condition appropriate PM generation amount pmTA. The steady-condition appropriate NOx generation amount noxTA and the steady-condition appropriate PM generation amount pmTA are an NOx generation amount and a PM generation amount previously determined such that their combination becomes optimal from the viewpoint of the balance between the NOx generation amount and the PM generation amount (the ratio between the NOx generation amount and the PM generation amount becomes a target ratio) when the engine is operated steady under present operating conditions (the required fuel injection quantity Q and engine rotational speed NE).

The tables MapnoxTA(Q, NE) and MappmTA(Q, NE) are obtained as follows. An experiment is performed so as to determine the steady-condition appropriate NOx generation amount noxTA and the steady-condition appropriate PM generation amount pmTA in a state where the engine is operated in a steady condition with a certain required fuel injection quantity Q and engine rotational speed NE. This experiment is repeated, while the required fuel injection quantity Q and the engine rotational speed NE are changed to various values, to thereby obtain the tables MapnoxTA(Q, NE) and MappmTA(Q, NE). Means for obtaining the steady-condition appropriate NOx generation amount noxTA and the steady-condition appropriate PM generation amount pmTA in accordance with the tables MapnoxTA(Q, NE) and MappmTA(Q, NE) corresponds to the steady-condition-appropriate-value obtainment means.

Here, a point corresponding to a combination of the steady-condition appropriate NOx generation amount noxTA and the steady-condition appropriate PM generation amount pmTA is called an appropriate point A. In this case, as shown in FIG. 5, the appropriate point A at the present point in time is always on the trade-off line when the engine is maintained in steady operating condition. That is, if the appropriate point A at the present point in time is used as an emission target value, and the EGR ratio Regr is controlled so as to coincide with an EGR ratio Regr (=RegrA) corresponding to the appropriate point A at the present point in time, the ratio between the NOx generation amount and the PM generation amount can be rendered coincident with a target ratio appropriately determined through the above-described experiment.

Meanwhile, when the engine is in transient operating condition, for example, in a case where the engine rotational speed NE rapidly increases, as described above, the trade-off line changes with time depending on the value Z (that is, the cylinder interior intake gas quantity Gcyl and the required fuel injection quantity Q) which changes with time. As a result, the appropriate point A at the present point in time is not on the trade-off line.

Figure 6:
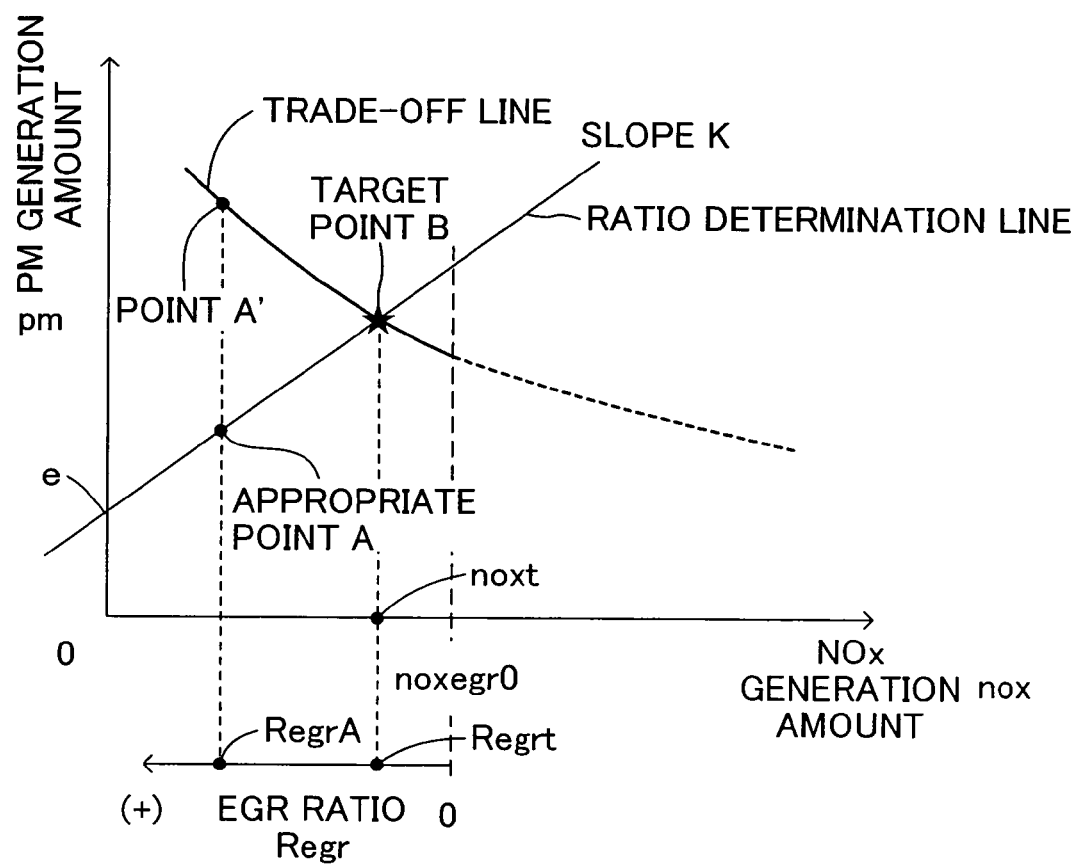
FIG. 6 is a diagram for describing a method which is used by the control apparatus shown in FIG. 1 in order to determine an EGR ratio target value.

FIG. 6 shows an example relation between the appropriate point A at the present point in time and the trade-off line, for the case where the engine is in transient operating condition, and the value Z at the present point in time is less than the value at the time when an experiment was performed so as to determine the steady-condition appropriate NOx generation amount noxTA and steady-condition appropriate PM generation amount pmTA corresponding to the appropriate point A at the present point in time.

In the example shown in FIG. 6, when the EGR ratio Regr is controlled so as to coincide with the EGR ratio Regr (=RegrA) corresponding to the appropriate point A at the present point in time, a point A' is used as the emission target value, with the result that the ratio between the NOx generation amount and the PM generation amount is controlled so as to coincide with a ratio corresponding to the point A'. As a result, the ratio between the NOx generation amount and the PM generation amount can not be rendered coincident with the target ratio appropriately determined through the above-described experiment.

That is, when the engine is in transient operating condition, since the appropriate point A at the present point in time is not on the trade-off line, a problem arises as to which point on the trade-off line is to be used as the emission target value (that is, NOx generation amount target value and the PM generation amount target value).

As shown in FIG. 6, the present apparatus employs a straight line (hereinafter, referred to as a "ratio determination line") passing through the appropriate point A at the present point in time and having a slope K. The intersection (hereinafter, referred to as a "target point B") between the ratio determination line and the trade-off line is used as the emission target value.

A method for setting the above-mentioned slope K will be described below with reference to FIG. 7. The dotted region of FIG. 7 indicates a legally permitted range of the total NOx generation amount and the total PM generation amount at the time when a vehicle equipped with the engine travels in a traveling mode (for example, "10·15 mode") which is determined by a law and used for measuring the quantity of fuel consumption and the quantity of exhaust gas. That is, a regulation point R indicates a point (fixed point) representing a combination of an allowable upper limit of the total NOx generation amount and an allowable upper limit of the total PM generation amount.

Further, the total NOx generation amount and the total PM generation amount are previously measured when the engine is operated steady under the present traveling condition (the required fuel injection quantity Q and engine rotational speed NE) for a period of time equal to the total time over which the vehicle travels in the above described traveling mode. A point representing a combination (individually measured values) of the previously measured total NOx generation amount and total PM generation amount is hereinafter referred to as a measured point C at the present point in time. That is, the measured point C moves depending on the operating condition (the required fuel injection quantity Q and the engine rotational speed NE) of the engine.

Figure 7:
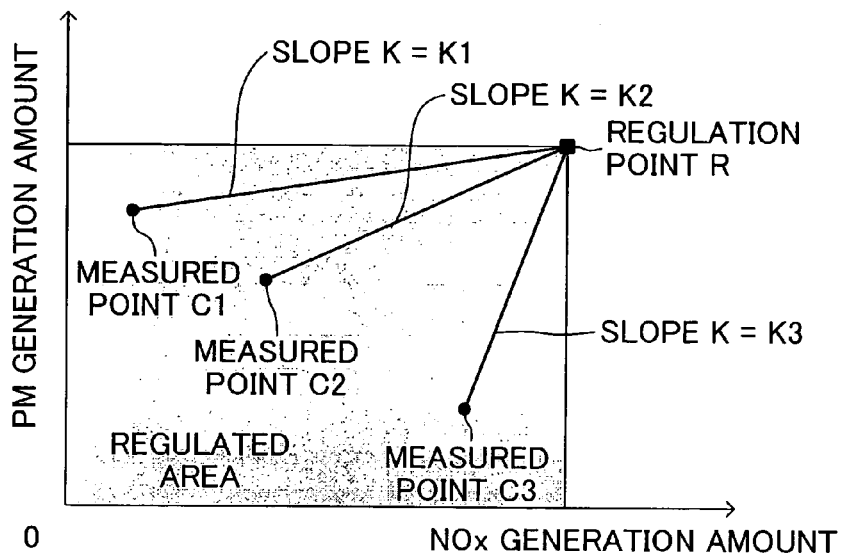
FIG. 7 is a diagram for describing a method of determining a slope of a ratio determination line which is used by the control apparatus shown in FIG. 1 in order to determine the EGR ratio target value.

As shown in FIG. 7, the slope K at the present point in time is determined to coincide with the slope of a line passing through the measured point C at the present point in time and the regulation point R. That is, for example, when the measured point C moves to a point indicated as a measured point C1, the slope K becomes K1; when the measured point C moves to a point indicated as a measured point C2, the slope K becomes K2; and when the measured point C moves to a point indicated as a measured point C3, the slope K becomes K3.

Here, for example, the case where the measured point C at the present point in time coincides with the measured point C1 will be considered. In this case, the PM generation amount corresponding to the measured point C1 is close to the corresponding allowable upper limit, while the NOx generation amount corresponding to the measured point C1 is sufficient small as compared with the corresponding allowable upper limit. That is the "allowance at the present point in time" of PM is less than the "allowance at the present point in time" of NOx. In this case, the slope K becomes relatively small (=K1). As a result, as can be understood from FIG. 6, the target ratio between the NOx generation amount and the PM generation amount, which corresponds to a target point B, is determined such that the PM generation amount which has a small "allowance at the present point in time" is more suppressed.

Here, the case where the measured point C at the present point in time coincides with the measured point C3 will be considered. In this case, the NOx generation amount corresponding to the measured point C3 is close to the corresponding allowable upper limit, and the PM generation amount corresponding to the measured point C3 is sufficient small as compared with the corresponding allowable upper limit. That is, the "allowance at the present point in time" of NOx is less than the "allowance at the present point in time" of PM. In this case, the slope K becomes relatively large (=K3). As a result, as can be understood from FIG. 6, the target ratio between the NOx generation amount and the PM generation amount, which corresponds to the target point B, is determined such that the NOx generation amount which has a small "allowance at the present point in time" is more suppressed.

That is, as described above, when the slope of a line passing through the measured point C at the present point in time and the regulation point R is used as the slope K at the present point in time, the target ratio between the NOx generation amount and the PM generation amount is determined such that either NOx or PM, whichever has a smaller "allowance at the present," is more suppressed. Thus, the target ratio between the NOx generation amount and the PM generation amount is determined such that neither the NOx generation amount nor the PM generation amount exceeds the corresponding allowable upper limit if possible.

<Specific Method for Determining an EGR Ratio Target Value Regrt>

Next, a specific method for determining the EGR ratio target value Regrt will be described. As described above, the measured point C which moves depending on the operating condition (the required fuel injection quantity Q and the engine rotational speed NE) of the engine is a point corresponding to a combination of the total NOx generation amount and total PM generation amount which are previously measured. Further, the regulation point R is known. Accordingly, the relation between the operating condition (the required fuel injection quantity Q and the engine rotational speed NE) of the engine and the slope K can be previously obtained.

The present apparatus stores in the ROM 62 a table MapK(Q, NE) which defines the relation between the slope K and the operating condition (the required fuel injection quantity Q and the engine rotational speed NE). Accordingly, the slope K at the present point in time can be obtained by searching the table MapK(Q, NE). Moreover, the steady-condition appropriate amounts noxTA and pmTA at the present point in time corresponding to the appropriate point A at the present point in time can be obtained by searching in the above-described tables MapnoxTA(Q, NE) and MappmTA(Q, NE).

Accordingly, when the ratio determination line is represented by the following Eq. 9, a value e (see FIG. 6) in Eq. 9 can be obtained in accordance with the following Eq. 10 making use of the slope K at the present point in time and the steady-condition appropriate amounts noxTA and pmTA at the present point in time. Notably, the right side of Eq. 9 is a function for obtaining the PM generation amount pm, while using the variables K, e, and nox as arguments. In the following description, the right side of Eq. 9 may be represented as "funcpm2(K, e, nox)." Means for determining the ratio between the NOx generation amount and the PM generation amount in accordance with Eq. 9 corresponds to the ratio determination means. Further, the right side of Eq. 10 is a function for obtaining the value e, while using the variables K, noxTA, and pmTA as arguments. In the following description, the right side of Eq. 10 may be represented as "func(K, noxTA, pmTA)."

$$pm = K \cdot nox + e \quad (9)$$

$$e = pmTA - K \cdot noxTA \quad (10)$$

Here, when Eq. 8 and Eq. 9, which are simultaneous equations, are combined to eliminate the PM generation amount pm therefrom, the NOx generation amount nox is obtained. This nox is used as an NOx generation amount target value noxt corresponding to the target point B shown in FIG. 6. The NOx generation amount target value noxt can be represented by the following Eq. 11. Notably, the right side of Eq. 11 is a function for obtaining the NOx generation amount target value noxt, while using variables K, e, and Z as arguments. In the following description, the right side of Eq. 11 may be represented as "funcnoxt(K, e, Z)."

$$noxt = \frac{-g - \sqrt{g^2 - 4f \cdot h}}{2f} \quad (11)$$

where

-continued $$f = d \cdot k$$

$$g = -RO2air \cdot a \cdot K \cdot \left(1 + \frac{d}{Z} + d\right) - c - b \cdot d \cdot K + d \cdot e$$

$$h = RO2air \cdot a \cdot \left(\frac{c}{Z} - \frac{d \cdot e}{Z} - e + c - d \cdot e\right) + b \cdot (c - d \cdot e)$$

In this manner, when the NOx generation amount target value noxt corresponding to the target point B is obtained, the EGR ratio target value Regrt shown in FIG. 6 can be obtained by replacing nox in Eq. 6 with noxt (Regrt=funcRegr(noxt, Z)). Means for determining the EGR ratio target value Regrt in this manner corresponds to the EGR-ratio-target-value determination means.

The present apparatus obtains the EGR ratio target value Regrt in the above-described manner, and controls the EGR ratio Regr (specifically, controls the opening of the throttle valve 33 and the opening of the EGR control valve 52) such that the EGR ratio obtainment value Regract at the present point in time coincides with the EGR ratio target value Regrt at the present point in time. As a result, even if the engine is in steady operating condition or transient operating condition, the NOx generation amount and the PM generation amount are controlled such that the ratio between the NOx generation amount and the PM generation amount coincides with the target ratio corresponding to the target point B (in steady operating condition, the target point B coincides with the appropriate point A) shown in FIG. 6.

<Dealing with a Case Where the EGR Ratio Target Value Becomes Negative>

Figure 8:
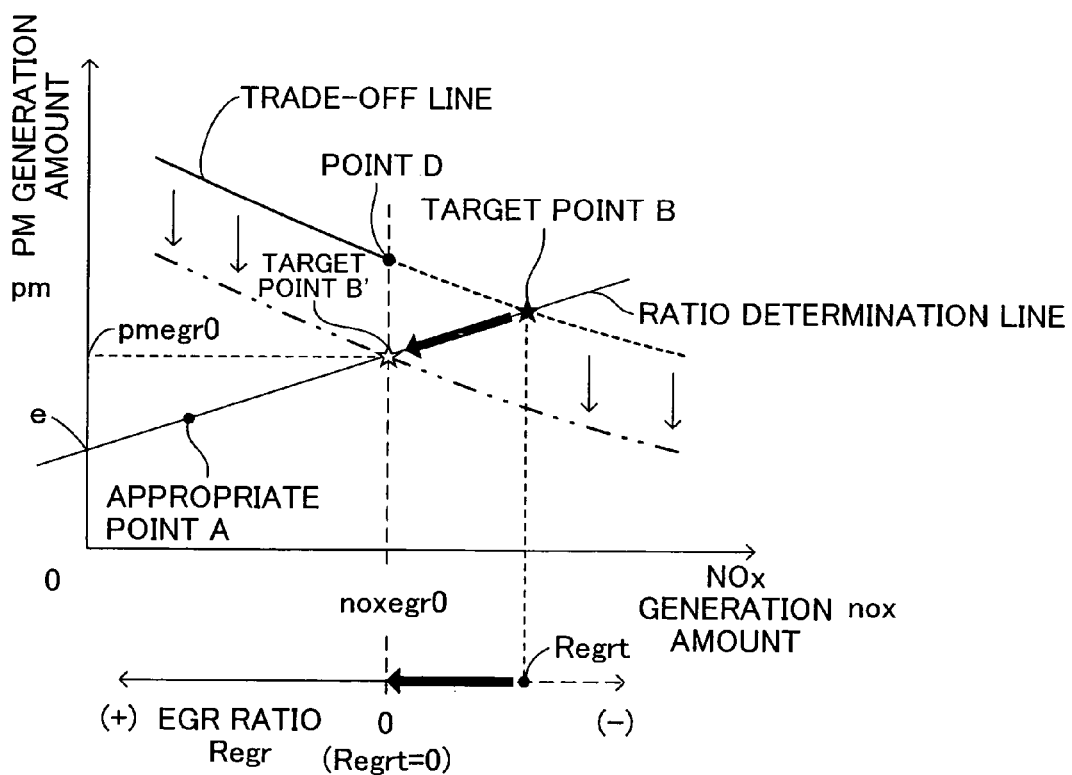
FIG. 8 is a diagram for describing a method of dealing with a case where the EGR ratio target value becomes negative.

In actuality, the value of the EGR ratio Regr is in the range of "0" to "1" inclusive. However, for example, when the above-described value Z becomes relatively small because the engine is in a transient condition in which operating conditions change excessively, and the slope K is set to a relatively small value, the EGR ratio target value Regrt corresponding to the target point B may become negative as shown in FIG. 8.

In this case, the present apparatus rests the EGR ratio target value Regrt to "0" which can be achieved. However, when the EGR ratio is controlled with the EGR ratio target value Regrt set to "0" such that the EGR ratio obtainment value Regract becomes "0," the ratio between the NOx generation amount and the PM generation amount is controlled so as to coincide with a ratio corresponding to a point D as shown in FIG. 8. As a result, the ratio between the NOx generation amount and the PM generation amount can not be rendered coincident with the ratio determined on the basis of the above-described ratio determination line.

Here, in order to render the ratio between the NOx generation amount and the PM generation amount coincident with the ratio determined on the basis of the above-described ratio determination line while controlling the EGR ratio such that the EGR ratio obtainment value Regract becomes "0," it is necessary to adjust the above-described value Z such that the trade-off line passes through the target point B', and to use the target point B' as the emission target value.

Such value Z (=Zegr0) can be obtained by substituting the NOx generation amount nox (=noxegr0 (constant)) and the PM generation amount Pm (=pmegr0), which are correspond to the target point B', for nox and pm in the above-described Eq. 8 representing the trade-off line. That is, the value Zegr0 is the value Z for establishing pmegr0=funcpm1 (Z, noxegr0). Notably, the value pmegr0 can be determined by replacing nox in the above-describing Eq. 9 with noxegr0 (pmegr0=funcpm2 (K, e, noxegr0)).

In order to adjust the value Z (=Gcyl/(Q·AFth)) to the above-described Zegr0, the required fuel injection quantity Q can be adjusted (limited) to a fuel injection quantity limit value Qlimit represented by the following Eq. 12.

$$Qlimit=Gcyl/(Zegr0 \cdot AFth) \quad (12)$$

Notably, limiting the required fuel injection quantity Q to the above-described fuel injection quantity limit value Qlimit is equivalent to moving the trade-off line to a curve which is represented by a two-dot chain line in FIG. 8 (that is, a curve which is obtained by moving the trade-off line downward so as to pass through the target point B). Means for obtaining the fuel injection quantity limit value Qlimit in this manner corresponds to the fuel-injection-quantity-limit-value obtainment means.

In view of the above, when the EGR ratio target value Regrt becomes negative, the present apparatus resets the EGR ratio target value Regrt to "0," and limits the required fuel injection quantity Q (actually, an instruction fuel injection quantity qfin to be described later) to the fuel injection quantity limit value Qlimit. Thus, the ratio between the NOx generation amount and the PM generation amount can be rendered coincident with the ratio determined on the basis of the above-described ratio determination line, while controlling the EGR ratio such that the EGR ratio obtainment value Regract becomes "0." The above is the outline of the EGR control by the present apparatus.

(Actual Operation)

Figure 9:
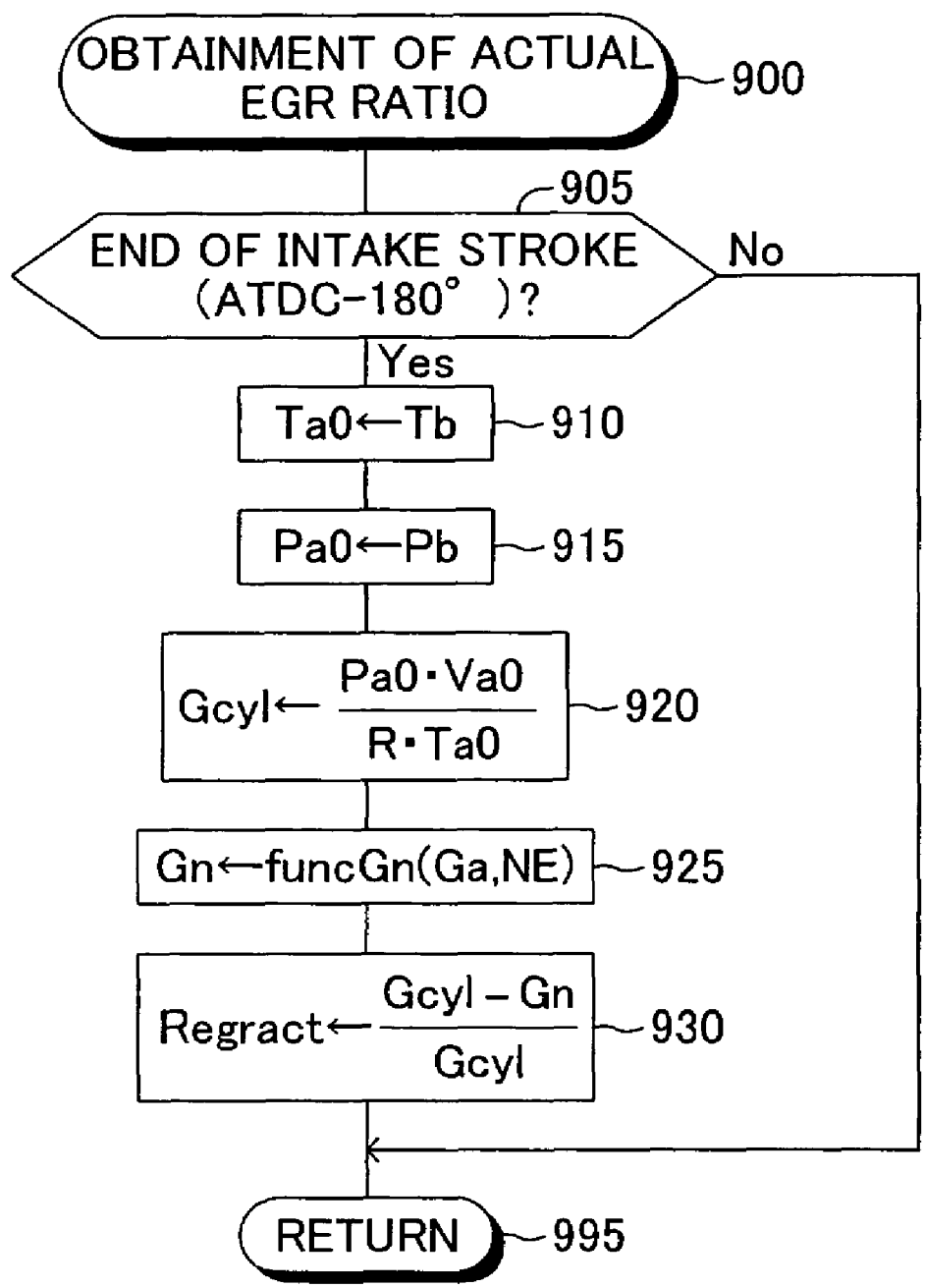
FIG. 9 is a flowchart showing a routine which a CPU shown in FIG. 1 executes in order to obtain an EGR ratio obtainment value.

Next, actual operations of the control apparatus for the internal combustion engine having the above-described configuration will be described. The CPU 61 repeatedly executes, at predetermined intervals (for example, 8 msec), a routine shown by the flowchart of FIG. 9 and adapted to obtain the EGR ratio obtainment value Regract. Therefore, when a predetermined timing has been reached, the CPU 61 starts the processing from Step 900, and then proceeds to Step 905 so as to determine whether or not the present time coincides with the end of the intake stroke of a certain cylinder (that is, whether or not the ATDC-180° has been reached). When the CPU 61 makes a "No" determination in Step 905, it proceeds directly to Step 995 and ends the current execution of the present routine.

Meanwhile, when the CPU 61 makes a "Yes" determination in Step 905, it proceeds to Step 910. In Step 910, the CPU 61 obtains the intake gas temperature Tb, which is obtained from the intake gas temperature sensor 72, as the bottom dead center cylinder interior gas temperature Ta0. In Step 915 subsequent thereto, the CPU 61 obtains the intake pipe pressure Pb, which is obtained from the intake pipe pressure sensor 73, as the bottom dead center cylinder interior gas pressure Pa0.

Subsequently, the CPU 61 proceeds to Step 920 so as to obtain the cylinder interior intake gas quantity Gcyl in accordance with the following Eq. 13, which is based on the state equation of gas. In Eq. 13, Va0 represents the bottom dead center combustion chamber interior volume at ATDC-180°. The combustion chamber interior volume can be represented as a function of the crank angle on the basis of the design specifications of the engine 10, whereby the bottom dead center combustion chamber interior volume Va0 can be obtained in accordance with this function. The following Eq. 13 is on the assumption that the cylinder interior gas temperature and the cylinder interior gas pressure are generally equal to the intake gas temperature Tb and the intake pipe pressure Pb at ATDC-180°, respectively. Means for obtaining the cylinder interior intake gas quantity Gcyl in accordance with Eq. 13 corresponds to the cylinder-interior-intake-gas-quantity calculation means.

$$Gcyl=Pa0 \cdot Va0/(R \cdot Ta0) \quad (13)$$

Subsequently, the CPU 61 proceeds to Step 925 so as to determine the quantity Gn of new air taken into a cylinder during a single intake stroke on the basis of the new air quantity Ga per unit time at the present point in time, which is obtained from the air flow meter 71, the engine speed NE at the present point in time, which is obtained from the crank position sensor 74, and the function funcGn for obtaining the quantity Gn of new air taken into the cylinder during an intake stroke while using Ga and NE as augments.

The CPU 61 proceeds to Step 930 so as to obtain the EGR ratio obtainment value Regract in accordance with the obtained cylinder interior intake gas quantity Gcyl, the obtained quantity Gn of new air taken into a cylinder during a single intake stroke, and the equation which is described in the box of Step 930 and corresponds to the above-described Eq. 4. After that, the CPU 61 proceeds to Step 995 and ends the current execution of the present routine. In this manner, EGR ratio obtainment value Regract is updated every time the end of the intake stroke of a certain cylinder comes. Step 930 corresponds to the EGR-ratio-obtainment-value obtainment means.

Figure 10:
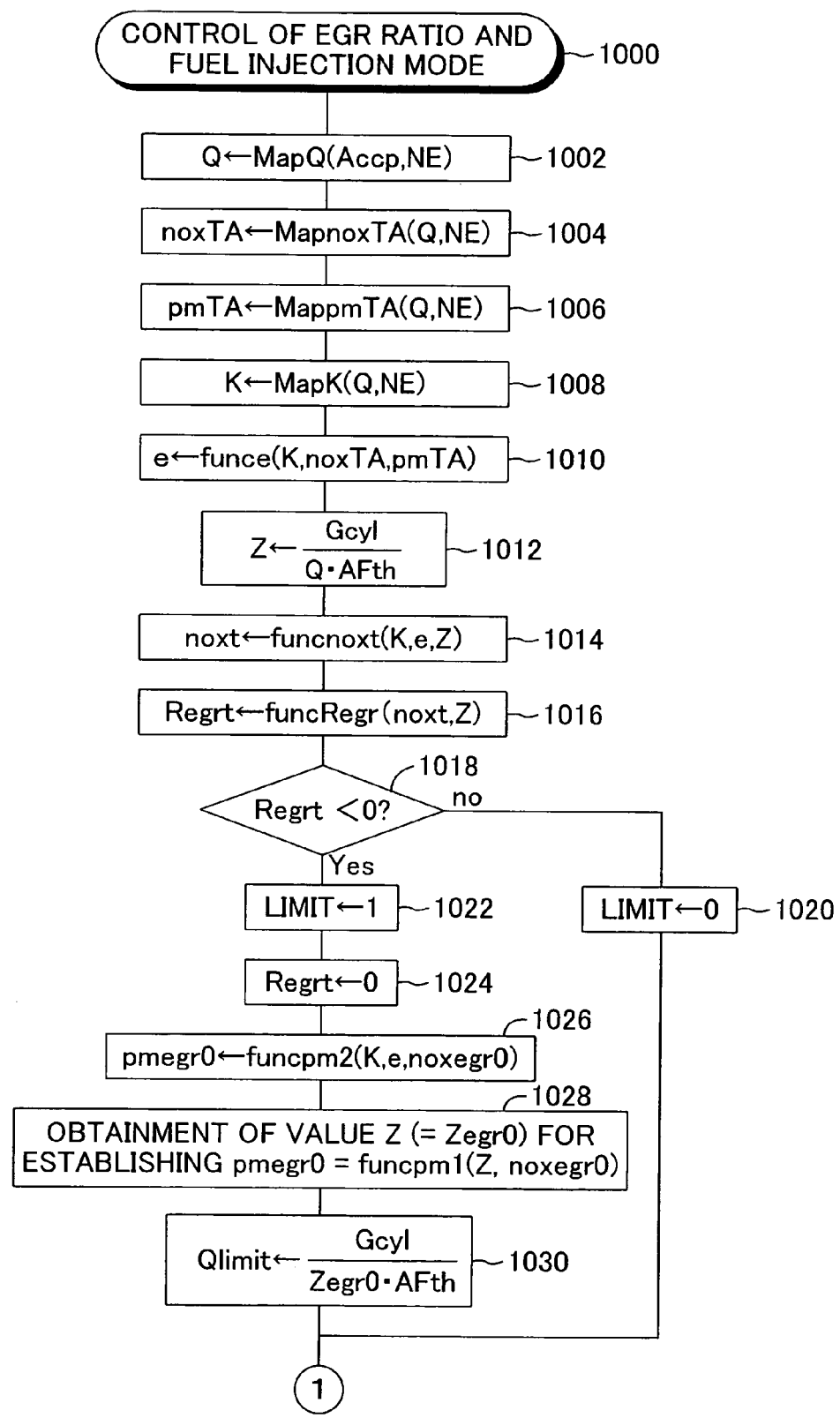
FIG. 10 is a flowchart showing a first half of a routine which the CPU shown in FIG. 1 executes in order to control an EGR ratio and a fuel injection mode.
Figure 11:
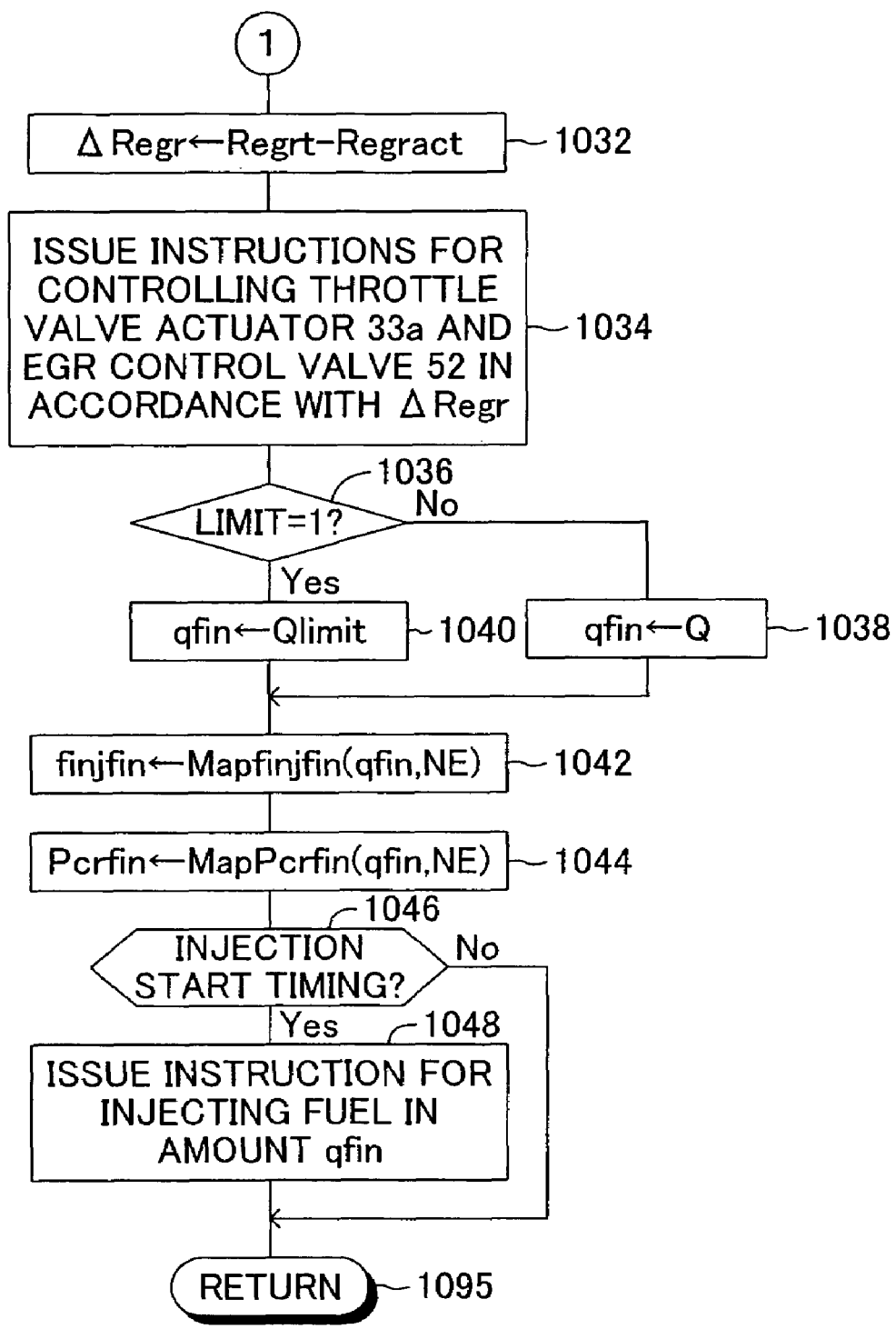
FIG. 11 is a flowchart showing a second half of the routine which the CPU shown in FIG. 1 executes in order to control the EGR ratio and the fuel injection mode.
Figure 12:
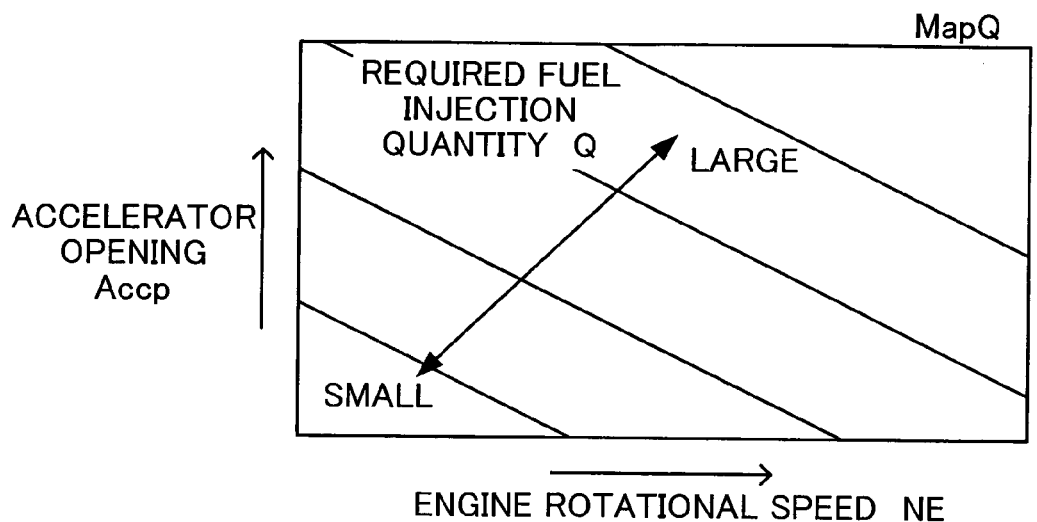
FIG. 12 is a table which the CPU shown in FIG. 1 refers to for determining required fuel injection quantity during the execution of the routine shown in FIG. 10.

Further, the CPU 61 repeatedly executes, at predetermined intervals (for example, 8 msec), a routine shown by the flowcharts of FIGS. 10 and 11 to control the EGR ratio and the fuel injection mode. Therefore, when a predetermined timing has been reached, the CPU 61 starts the processing from Step 1000, and then proceeds to Step 1002 so as to determine the required fuel injection quantity Q at the present point in time from the accelerator pedal operated amount Accp, the engine rotational speed NE, and the table MapQ shown in FIG. 12. The table MapQ is a table which defines the relation between the accelerator opening Accp and the engine speed NE, and the required fuel injection quantity Q; and is stored in the ROM 62. Thus, means for determining the required fuel injection quantity Q by making use of the table MapQ corresponds to the required-fuel-injection-quantity determination means.

Subsequently, the CPU 61 proceeds to Step 1004 so as to determine the steady-condition appropriate NOx generation amount noxTA at the present point in time from the obtained required fuel injection quantity Q, the engine rotational speed NE, and the table MapnoxTA stored in the ROM 62.

Subsequently, the CPU 61 proceeds to Step 1006 so as to determine the steady-condition appropriate PM generation amount pmTA at the present point in time from the obtained required fuel injection quantity Q, the engine rotational speed NE, and the table MappmTA stored in the ROM 62.

Subsequently, the CPU 61 proceeds to Step 1008 so as to determine the slope K at the present point in time from the obtained required fuel injection quantity Q, the engine rotational speed NE, and the table MapK stored in the ROM 62.

Next, the CPU 61 proceeds to Step 1010 so as to determine a value e from the obtained slope K, the obtained steady-condition appropriate NOx generation amount noxTA, the obtained steady-condition appropriate PM generation amount pmTA, and Eq. 10. The CPU 61 proceeds to Step 1012 so as to determine the value Z at the present point in time from the cylinder interior intake gas quantity Gcyl calculated in Step 925, the obtained required fuel injection quantity Q, and a definition equation of the value Z, which is described in the box of Step 1012.

Next, the CPU 61 proceeds to Step 1014 so as to determine the NOx generation amount target value noxt from the obtained slope K, the obtained value e, the obtained value Z, and Eq. 11. The CPU 61 then proceeds to Step 1016 so as to determine the EGR ratio target value Regrt from the obtained NOx generation amount target value noxt, the obtained value Z, and Eq. 6.

Subsequently, the CPU 61 proceeds to Step 1018 so as to determine whether the obtained EGR ratio target value Regrt is negative. Here, when the obtained EGR ratio target value Regrt is equal to or greater than "0," the CPU 61 makes a "No" determination in Step 1018, and proceeds to Step 1020 so as to set the value of the flag LIMIT to "0." After that the CPU 61 proceeds to Step 1032 of FIG. 11.

Here, the flag LIMIT indicates that the EGR ratio target value Regrt is equal to or greater "0" when its value is "0," and that the EGR ratio target value Regrt is negative when its value is "1."

Meanwhile, when the obtained EGR ratio target value Regrt is negative, the CPU 61 makes a "Yes" determination in Step 1018, and proceeds to Step 1022 so as to set the value of the flag LIMIT to "1." In Step 1024 subsequent thereto, the CPU 61 resets the EGR ratio target value Regrt to "0."

Subsequently, the CPU 61 proceeds to Step 1026 so as to determine the above-described value pmegr0 from the obtained slope K, the obtained value e, the above-described value noxegr0, and Eq. 9. The CPU 61 then proceeds to Step 1028 so as to determine the above-described value Zegr0 from the obtained value pmegr0, the value noxegr0, and Eq. 8. In Step 1030 subsequent to Step 1028, the CPU 61 determines the fuel injection quantity limit value Qlimit from the obtained cylinder interior intake gas quantity Gcyl, the obtained value Zegr0, and Eq. 12. After that, the CPU 61 proceeds to Step 1032 of FIG. 11.

In Step 1032, the CPU 61 determines an EGR ratio deviation ΔRegr by subtracting the EGR ratio obtainment value Regract obtained in the previous Step 930 from the obtained EGR ratio target value Regrt. In Step 1034 subsequent thereto, the CPU 61 outputs instructions for driving the throttle valve actuator 33$a$ and the EGR control valve 52 in accordance with the obtained EGR ratio deviation ΔRegr such that the EGR ratio obtainment value Regract becomes equal to the EGR ratio target value.

As a result, control is repeatedly executed such that the EGR ratio obtainment value Regract becomes equal to the EGR ratio target value Regrt, whereby the ratio between the NOx generation amount and the PM generation amount is rendered coincident with the ratio determined on the basis of the ratio determination line. This Step 1034 corresponds to the EGR-control-valve control means.

Subsequently, the CPU 61 proceeds to Step 1036 so as to determine whether the value of the flag LIMIT is "1." When the CPU 61 makes a "No" determination (that is, the EGR ratio target value regrt has been reset to "0"), it proceeds to Step 1038 so as to set the instruction fuel injection quantity qfin to the fuel injection quantity limit value Qlimit calculated in the previous Step 1030.

Meanwhile, when the CPU 61 makes a "Yes" determination in Step 1036, it proceeds to Step 1040 so as to set the instruction fuel injection quantity qfin to the required fuel injection quantity Q determined in the previous Step 1002.

Figure 13:
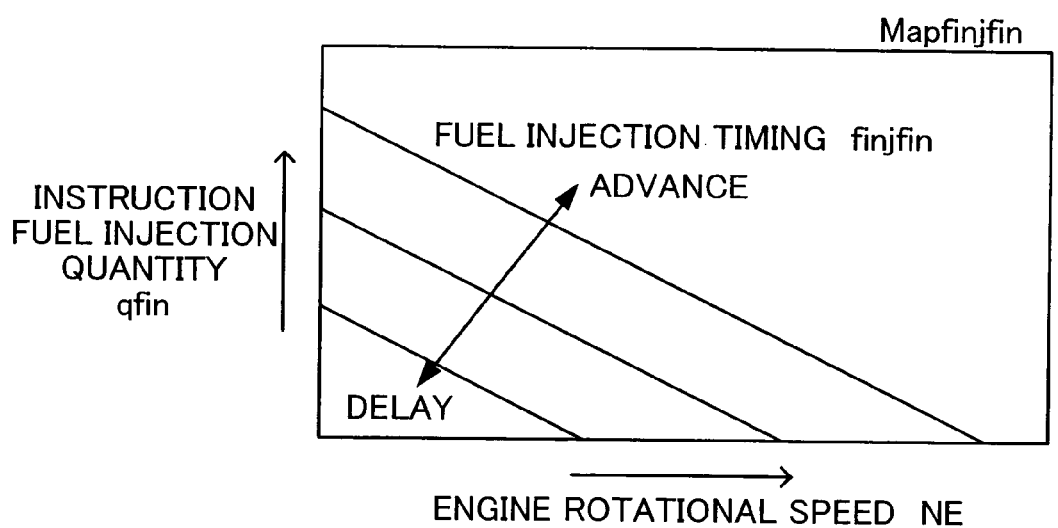
FIG. 13 is a table which the CPU shown in FIG. 1 refers to for determining fuel injection timing during execution of the routine shown in FIG. 11.

Subsequently, the CPU 61 proceeds to Step 1042 so as to determine the fuel injection timing finjfin from the obtained instruction fuel injection quantity qfin, the engine rotational speed NE, and the table Mapfinjfin shown in FIG. 13. The table Mapfinjfin is a table which defines the relation between the instruction fuel injection quantity qfin and the engine rotational speed NE, and the fuel injection timing finjfin. The table Mapfinjfin is stored in the ROM 62.

Figure 14:
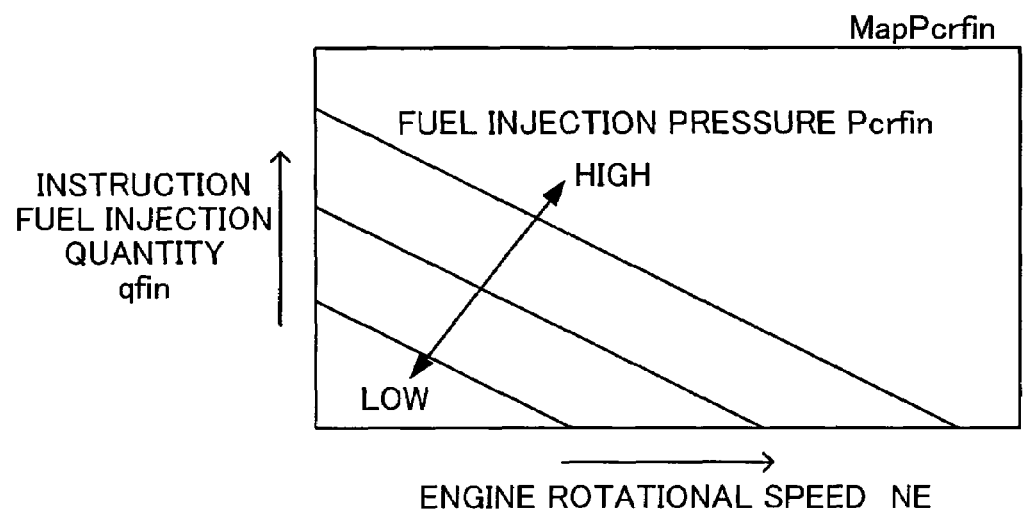
FIG. 14 is a table which the CPU shown in FIG. 1 refers to for determining fuel injection pressure during execution of the routine shown in FIG. 11.

Next, the CPU 61 proceeds to Step 1044 so as to determine the fuel injection pressure Pcrfin from the obtained instruction fuel injection quantity qfin, the engine rotational speed NE, and the table MapPcrfin shown in FIG. 14. The table MapPcrfin is a table which defines the relation between the instruction fuel injection quantity qfin and the engine rotational speed NE, and the fuel injection pressure Pcrfin. The table MapPcrfin is stored in the ROM 62.

The CPU 61 proceeds to Step 1046 so as to determine whether or not the fuel injection timing finjfin comes. When the CPU 61 makes a "No" determination in Step 1046, it proceeds to Step 1095 without injecting fuel, and ends the current execution of the present routine. Meanwhile, when the fuel injection timing finjfin comes, the CPU 61 makes a "Yes" determination in Step 1046 and proceeds to 1048 so as to output an instruction for injecting fuel of the obtained instruction fuel injection quantity qfin, to the injector 21 of a cylinder which has reached the obtained instruction fuel injection timing finjfin. After that, the CPU 61 proceeds to Step 1095 so as to end the current execution of the present routine.

As described above, in the control apparatus for the internal combustion engine according to the embodiment of the present invention, the NOx generation amount estimation model (above-described Eq. 1), which calculates the NOx generation amount on the basis of the intake gas oxygen mole concentration RO2in, and the PM generation amount estimation model (the above-described Eq. 2), which calculates the PM generation amount on the basis of the excess air factor λ, are employed so as to obtain the equation (above-described Eq. 8, the trade-off line of FIG. 6), which makes use of the required fuel injection quantity Q and the cylinder interior intake gas quantity Gcyl (that is, making use of the value Z) and represents the "relation between the NOx generation amount and the PM generation amount" while using the EGR ratio Regr as a parameter.

Further, the equation (the above-described Eq. 9, the ratio determination line of FIG. 6) representing a line, which passes through a point (the appropriate point A of FIG. 6) corresponding to a combination of the steady-condition appropriate NOx generation amount and the steady-condition appropriate PM generation amount in the present operating condition and has a slope K determined in consideration of the regulation value under the law relating to emission control, is obtained. The EGR ratio target value Regrt is set to an EGR ratio Regr corresponding to the target point B with the intersection (the target point B of FIG. 6) between the trade-off line and the ratio determination line used as the emission target value.

Thus, the NOx generation amount and the PM generation amount are controlled such that irrespective of whether the engine is in steady operating condition or transient operating condition, the ratio between the NOx generation amount and the PM generation amount coincides with a target ratio which is determined in consideration of the above-described regulation value corresponding to the target point B shown in FIG. 6 (the target point B coincides with B in steady operating condition). Accordingly, the balance of the NOx generation amount and the PM generation amount can be properly maintained so as to effectively reduce the overall emission generation amount.

Figure 15:
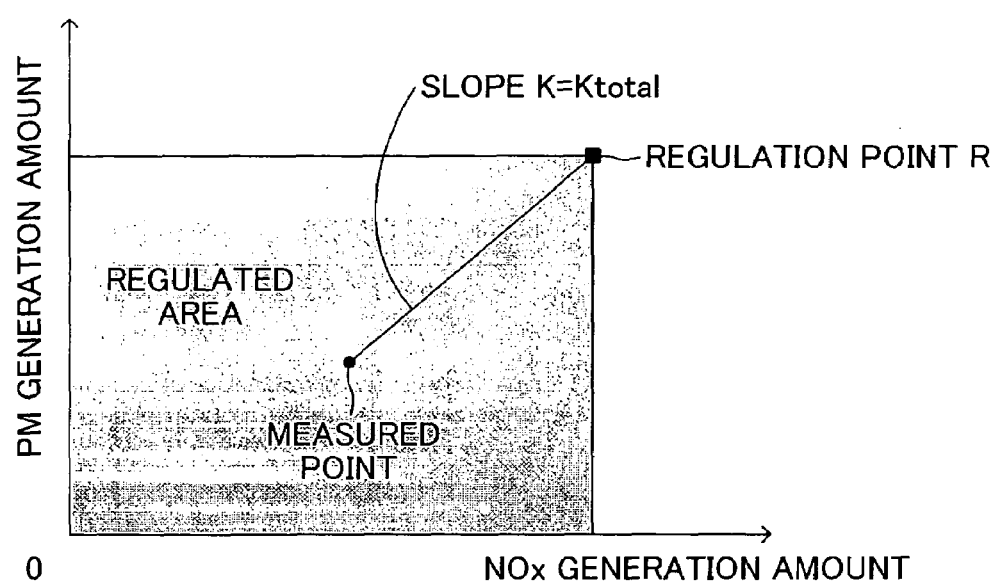
FIG. 15 is a diagram for describing other examples of the method of determining the slope of the ratio determination line, which is used for determining the EGR ratio target value.

The present invention is not limited to the above-described embodiment, and various modifications may be employed without departing from the scope of the present invention. For example, in the above-described embodiment, the control apparatus for the internal combustion engine is configured in such a manner that the slope of a line passing through both the measured point C (individually measured value; See FIG. 7) which can move in accordance with the operating conditions (the required fuel injection quantity Q and the engine rotational speed NE) of the engine and the regulation point R (a fixed point; see FIG. 7) is used as the slope K. However, the control apparatus may be configured to use, as the slope K, the slope (steady value) of a line, which, as shown in FIG. 15, passes through the regulation point R (fixed point) and a point (measured point Ctotal) corresponding to the combination (total measured values) of the total NOx generation amount and total PM generation amount previously measured when a vehicle equipped with the engine travels in a traveling mode (for example, "10·15 mode") which is defined by the law and used for measuring the quantity of fuel consumption and the quantity of exhaust gas.

According to this configuration, since the slope K becomes constant, it becomes unnecessary to store the table MapK(Q, NE), which is used to obtain the variable slope K and which defines the relation between the slope K and the operating conditions (the required fuel injection quantity Q and the engine rotational speed NE). Therefore, this configuration can save the memory space of the ROM 62, and can reduce the computing load of CPU 61 associated with table search.

Moreover, in the above-described embodiment, the control apparatus for the internal combustion engine is configured in such a manner that at execution intervals (for example 8 msec) of the routines shown in FIG. 10 and FIG. 11, the EGR ratio is controlled in accordance with the EGR ratio deviation ΔRegr such that the EGR ratio obtainment value Regract coincides with the EGR ratio target value Regrt (see Step 1034). However, the control apparatus may be configured in such a manner that every time the EGR ratio obtainment value Regract is updated in Step 930 of FIG. 9 (that is, every time the end of the intake stroke of a certain cylinder comes), the EGR ratio is controlled in accordance with the EGR ratio deviation ΔRegr such that the EGR ratio obtainment value Regract coincides with the EGR ratio target value Regrt.

Further, in the above-described embodiment, when the EGR ratio target value becomes negative, the control apparatus calculates a fuel injection quantity limit value Qlimit, which is a fuel injection quantity required to obtain a trade-off line for bringing the EGR ratio target value Regrt to "0" while maintaining the ratio between the NOx generation amount and the PM generation amount at the ratio based on the above-described ratio determination line, and the control apparatus limits the instruction fuel injection quantity qfin to the fuel injection quantity limit value Qlimit. However, the control apparatus may be configured in such a manner that, when the EGR ratio target value becomes negative, the control apparatus obtains a fuel injection quantity required to bring the excess air factor λ to "1" as a second fuel injection quantity limit value Qlimit2, and limits the instruction fuel injection quantity qfin to either the above-described fuel injection quantity limit value Qlimit or the second fuel injection quantity limit value Qlimit2, whichever is smaller.

In this case, the second fuel injection quantity limit value Qlimit2 can be determined from the following EQ. 14, which is obtained by substituting "0" for the EGR ratio Regr and "1" for the excess air factor λ in Eq. 3.

$$Qlimit2 = Gcyl/AFth \quad (14)$$

The invention claimed is:

1. A control apparatus for an internal combustion engine which includes an EGR passage for connecting an exhaust passage and an intake passage of the engine and an EGR control valve disposed in the EGR passage and adapted to control a flow rate of EGR gas flowing from the exhaust passage to the intake passage, the control apparatus comprising:
    operating-condition obtainment means for obtaining operating conditions of the engine;
    EGR-ratio-obtainment-value obtainment means for obtaining, as an EGR ratio obtainment value, an EGR ration on the basis of the obtained operating conditions, the EGR ratio being a ratio of a flow rate of EGR gas taken in a cylinder of the engine to a flow rate of gas taken in the cylinder of the engine;
    relation obtainment means for obtaining, on the basis of the obtained operating conditions, a relation between NOx generation amount and PM generation amount in the obtained operating conditions;
    generation ratio determination means for determining a ratio between the NOx generation amount and the PM generation amount;
    EGR-ratio-target-value determination means for determining a target value of the EGR ratio from the obtained relation and the determined ratio; and
    EGR-control-valve control means for controlling the opening of the EGR control valve such that the EGR ratio obtainment value coincides with the EGR ratio target value.

2. A control apparatus for an internal combustion engine according to claim 1, wherein the relation obtainment means obtains the relation between the NOx generation amount and the PM generation amount by making use of an NOx generation amount estimation model which calculates the NOx generation amount on the basis of an intake-gas oxygen concentration, which is an oxygen concentration of gas taken into the cylinder of the engine, and a PM generation amount estimation model which calculates the PM generation amount on the basis of an excess air factor of the gas taken into the cylinder of the engine.

3. A control apparatus for an internal combustion engine according to claim 1, further comprising:
    required-fuel-injection-quantity determination means for determining a required fuel injection quantity, which is a quantity of fuel to be injected, on the basis of the obtained operating conditions; and
    cylinder-interior-intake-gas-quantity determination means for determining a cylinder interior intake gas quantity, which is a quantity of gas taken into the cylinder of the engine, on the basis of the obtained operating conditions, wherein
    the relation obtainment means obtains the relation between the NOx generation amount and the PM generation amount by making use of the determined required fuel injection quantity and the calculated cylinder interior intake gas quantity.

4. A control apparatus for an internal combustion engine according to claim 1, wherein the generation ratio determination means determines the ratio between the NOx generation amount and the PM generation amount by making use of a relation of two combinations that is a relation between a combination of the total NOx generation amount and the total PM generation amount previously measured when the engine is operated in accordance with a predetermined pattern, and a predetermined combination regarding a regulation value of the NOx generation amount and a regulation value of the PM generation amount.

5. A control apparatus for an internal combustion engine according to claim 1, wherein the generation ratio determination means determines the ratio between the NOx generation amount and the PM generation amount by making use of a relation of two combinations that is a relation between a combination of the NOx generation amount and the PM generation amount previously measured when the engine is operated steady in the obtained operating conditions, and a predetermined combination regarding a regulation value of the NOx generation amount and a regulation value of the PM generation amount.

6. A control apparatus for an internal combustion engine according to claim 5, further comprising steady-condition-appropriate-value obtainment means for obtaining, on the basis of the obtained operating conditions, the NOx generation amount and the PM generation amount previously determined such that the their combination becomes optimal when the engine is operated steady in the obtained operating conditions, as a steady-condition appropriate NOx generation amount and a steady-condition appropriate PM generation amount, respectively, wherein
   the generation ratio determination means determines the ratio between the NOx generation amount and the PM generation amount by making use of a formula representing a straight line which passes through a point corresponding to a combination of the obtained steady-condition appropriate NOx generation amount and steady-condition appropriate PM generation amount and which has a slope representing a ratio of an increase in the PM generation amount to an increase in the NOx generation amount, the ratio being obtained from the relation of the two combinations; and
   the EGR-ratio-target-value determination means determines the EGR ratio target value from the formula representing the relation between the NOx generation amount and the PM generation amount obtained by means of the relation obtainment means and the formula representing the straight line used by means of the generation ratio determination means.

7. A control apparatus for an internal combustion engine according to claim 1, wherein the EGR-ratio-target value determination means sets the EGR ratio target value to zero when the determined EGR ratio target value is negative.

8. A control apparatus for an internal combustion engine according to claim 7, further comprising:
   required-fuel-injection-quantity determination means for determining a required fuel injection quantity, which is a quantity of fuel to be injected, on the basis of the obtained operating conditions;
   fuel injection instruction means for instructing injection of fuel in the determined required fuel injection quantity; and
   fuel-injection-quantity-limit-value obtainment means, operable when the EGR ratio target value determined by means of the EGR-ratio-target-value determination means becomes negative, for obtaining, as a fuel injection quantity limit value, a fuel injection quantity required to obtain a relation between the NOx generation amount and the PM generation amount for bringing the EGR ratio target value determined by means of the EGR-ratio-target-value determination means to zero, while maintaining the ratio between the NOx generation amount and the PM generation amount determined by means of the generation ratio determination means, wherein,
   the fuel injection instruction means instructs injection of fuel in a quantity corresponding to the obtained fuel injection quantity limit value, instead of instructing injection of fuel in the determined required fuel injection quantity, when the EGR ratio target value determined by means of the EGR-ratio-target-value determination means becomes negative.

* * * * *